(12) United States Patent
Inai

(10) Patent No.: US 12,328,178 B2
(45) Date of Patent: Jun. 10, 2025

(54) CONTROL DEVICE, PROGRAM, SYSTEM, AND CONTROL METHOD

(71) Applicant: SoftBank Corp., Tokyo (JP)

(72) Inventor: Makoto Inai, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/638,594

(22) Filed: Apr. 17, 2024

(65) Prior Publication Data

US 2024/0267115 A1  Aug. 8, 2024

Related U.S. Application Data

(63) Continuation of application No. PCT/JP2022/038971, filed on Oct. 19, 2022.

(30) Foreign Application Priority Data

Oct. 20, 2021 (JP) ................................. 2021-171603

(51) Int. Cl.
*H04B 7/185* (2006.01)

(52) U.S. Cl.
CPC ................................ *H04B 7/18504* (2013.01)

(58) Field of Classification Search
CPC .......... H04W 36/14; H04W 4/42; B64D 45/00
See application file for complete search history.

(56) References Cited

U.S. PATENT DOCUMENTS

2016/0352413 A1  12/2016 Tani
2017/0276833 A1*  9/2017 Narabu .................. H04N 23/57
2020/0148374 A1*  5/2020 Kawai .................. B64C 29/0025
2020/0278703 A1*  9/2020 Shim ....................... G08G 5/723
2021/0050910 A1   2/2021 Matsuura
(Continued)

FOREIGN PATENT DOCUMENTS

CN     111314981 A  *  6/2020
JP     2019135823 A     8/2019
JP     2020167539 A    10/2020
(Continued)

OTHER PUBLICATIONS

International Search Report and Written Opinion (ISA/237) of the International Search Authority for International Patent Application No. PCT/JP2022/038971, mailed by the Japan Patent Office on Dec. 20, 2022.
(Continued)

*Primary Examiner* — Khalid W Shaheed

(57) ABSTRACT

Provided is a control device including: a feeder link determination unit which determines a state of a feeder link established between one flight vehicle, which functions as a stratospheric platform, forms a wireless communication area by emitting a beam, and provides a wireless communication service to a user terminal in the wireless communication area, and one gateway; and a flight vehicle control unit which controls the one flight vehicle such that, when the feeder link determination unit determines that the state of the feeder link satisfies a predetermined switching condition, the one flight vehicle switches a data communication via the one gateway to a data communication via a communication device in the wireless communication area in which the one flight vehicle has established a service link.

19 Claims, 8 Drawing Sheets

(56) References Cited

U.S. PATENT DOCUMENTS

2021/0078439 A1* 3/2021 Hashimoto ............ B64U 50/31
2022/0173794 A1  6/2022 Konishi

FOREIGN PATENT DOCUMENTS

JP  2020198481 A  12/2020
WO  2015114715 A1  8/2015

OTHER PUBLICATIONS

Decision to Grant a Patent issued for counterpart Japanese Application No. 2021-171603, transmitted from the Japanese Patent Office on Jan. 25, 2022 (drafted on Jan. 14, 2022).
Extended European Search Report for counterpart European Application No. 22883610.2, issued by the European Patent Office on Jan. 22, 2025.
Arum Steve Chukwuebuka et al., A review of wireless communication using high-altitude platforms for extended coverage and capacity, Computer Communications, vol. 157, May 1, 2020, pp. 232-256, https://doi.org/10.1016/j.comcom.2020.04.020.
Woo Lip Lim et al., Inter-System Handover Algorithms for HAPS and Tower-based Overlay UMTS, International Conference on Information Communications and Signal Processing, Dec. 6-9, 2005, pp. 419-424, Bangkok, Thailand, ISBN:0-7803-9283-3, IEEE.

* cited by examiner

CONTROL DEVICE, PROGRAM, SYSTEM, AND CONTROL METHOD

The contents of the following patent application(s) are incorporated herein by reference:
NO. 2021-171603 filed in JP on Oct. 20, 2021
NO. PCT/JP2022/038971 filed in WO on Oct. 19, 2022

BACKGROUND

1. Technical Field

The present invention relates to a control device, a program, a system, and a control method.

2. Related Art

Patent Document 1 describes a high altitude platform station (HAPS) that establishes a feeder link with a gateway on the ground, establishes a service link with a terminal on the ground, and provides a wireless communication service to the terminal by relaying communication between the gateway and the terminal.

CITATION LIST

Patent Document

Patent Document 1: Japanese Patent Application Publication No. 2019-135823

DESCRIPTION OF EXEMPLARY EMBODIMENTS

A feeder link between HAPS and a gateway on the ground may be disconnected due to the influence of weather or the like. In a case where a wireless communication line is provided as a backhaul service by the HAPS, when the line is disconnected, the service cannot be provided while the line is disconnected, and thus, it is necessary to take other measures. In a system 10 according to the present embodiment, for example, a configuration for providing the backhaul service is a hybrid configuration of the feeder link and a service link. Accordingly, even if the feeder link is disconnected, the backhaul service can be continued by the service link.

Hereinafter, the present invention will be described through embodiments of the invention, but the following embodiments do not limit the invention according to claims. In addition, not all of the combinations of features described in the embodiments are imperative to the solving means of the invention.

Figure 1:
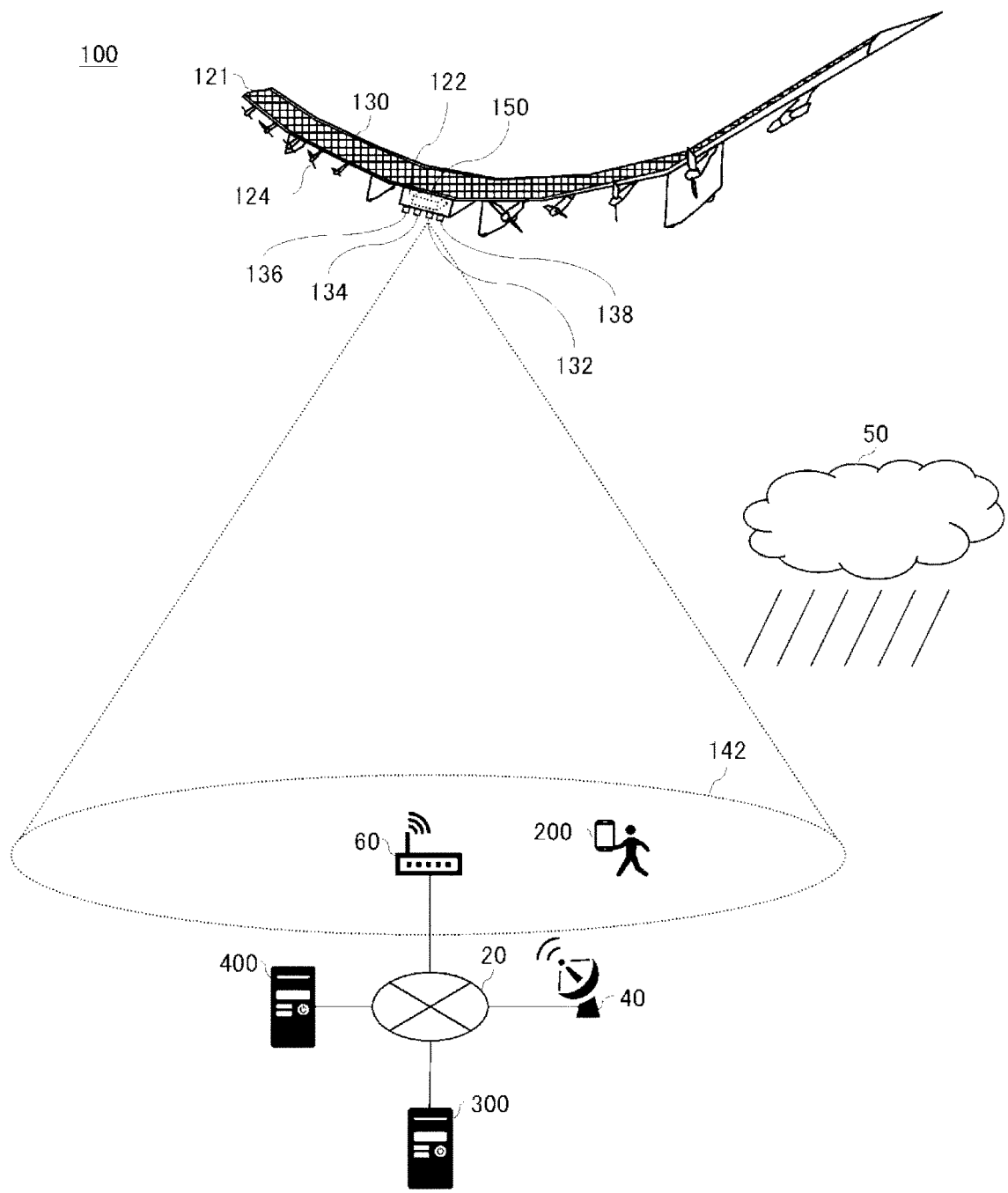
FIG. 1 schematically shows an example of a system 10.

FIG. 1 schematically shows an example of the system 10. The system 10 includes a flight vehicle 100. FIG. 1 shows an example in which the system 10 includes one flight vehicle 100. The system 10 may include a plurality of flight vehicles 100. The system 10 may include a gateway 40. The system 10 may include a communication device 60. The system 10 may include a weather management device 300. The system 10 may include a control device 400.

The flight vehicle 100 includes a main wing 121, a main body 122, a propeller 124, a solar cell panel 130, an antenna 132, an antenna 134, an antenna 136, and an antenna 138. The main body 122 includes a control device 150. A battery is arranged on at least one of the main wing 121 or the main body 122. The battery stores electric power generated by the solar cell panel 130.

The control device 150 controls the flight vehicle 100. The control device 150 controls the flight of the flight vehicle 100, for example. For example, the control device 150 causes the flight vehicle 100 to fly by using the electric power stored in the battery to rotate the propeller 124.

The control device 150 controls the communication of the flight vehicle 100, for example. For example, the control device 150 forms a wireless communication area 142 by emitting a beam using the antenna 132, and provides a wireless communication service to a user terminal 200 in the wireless communication area 142. For example, the control device 150 establishes a service link with the user terminal 200 in the wireless communication area 142 by using the antenna 132.

The user terminal 200 may be any communication terminal as long as the communication terminal can establish a service link with the flight vehicle 100. For example, the user terminal 200 is a mobile phone such as a smartphone, a tablet terminal, a wearable terminal, or the like. The user terminal 200 may be a personal computer (PC). The user terminal 200 may be an Internet of Thing (IoT) terminal. The user terminal 200 may include anything corresponding to the Internet of Everything (IoE).

For example, the control device 150 establishes a service link with the communication device 60, which is installed in the wireless communication area 142, by using the antenna 132. The communication device 60 may be any communication device as long as the communication device can relay the access of the flight vehicle 100 to the network 20. A plurality of communication devices 60 may exist in the wireless communication area 142. The control device 150 may access the network 20 via the communication device 60.

For example, the control device 150 establishes a feeder link with the gateway 40 on the ground by using the antenna 134. FIG. 1 shows an example in which the gateway 40 is installed outside an area on the ground as a target for forming the wireless communication area 142. The gateway 40 may be installed in the area on the ground as a target for forming the wireless communication area 142. The control device 150 may access the network 20 via the gateway 40.

The network 20 may include a core network provided by a communication operator. The core network is compliant with a 5G (5th Generation) communication system, for example. The core network may be compliant with a mobile communication system of a 6G (6th Generation) communication system onwards. The core network may be compliant with a 3G (3rd Generation) communication system. The core network may be compliant with an LTE (Long Term Evolution) communication system. The network 20 may include the Internet.

For example, the control device 150 establishes a wireless communication connection with another flight vehicle by using an antenna. The control device 150 establishes the wireless communication connection with another flight vehicle, for example, by using the antenna 136. The control device 150 establishes the wireless communication connection with another flight vehicle, for example, by using the antenna 138. The control device 150 may establish the wireless communication connection with another flight vehicle by using the antenna 134. For example, the control device 150 may access the network 20 via another flight vehicle.

For example, the flight vehicle 100 flies in the stratosphere to provide a wireless communication service to the user terminal 200. The flight vehicle 100 may function as a stratospheric platform. For example, while circulating over an area on the ground to be covered, the flight vehicle 100 covers the area by the wireless communication area 142.

The flight vehicle 100 has a function of acquiring information related to the flight vehicle 100. The flight vehicle 100 has a function of acquiring, for example, the flight position of the flight vehicle 100. The flight vehicle 100 has a function of acquiring the flight position of the flight vehicle 100, for example, by using a global navigation satellite system (GNSS) function mounted on the flight vehicle 100. The flight vehicle 100 has a function of acquiring the flight position of the flight vehicle 100, for example, by using a global positioning system (GPS) function mounted on the flight vehicle 100.

For example, the flight vehicle 100 has a function of acquiring information related to the communication state of the flight vehicle 100. The flight vehicle 100 has a function of acquiring the information related to the communication state between the flight vehicle 100 and the gateway 40, for example. The flight vehicle 100 may have a function of acquiring the information related to the communication state between the flight vehicle 100 and the communication device 60.

For example, the flight vehicle 100 has a function of acquiring information related to weather between the flight vehicle 100 and the gateway 40. The flight vehicle 100 has a function of acquiring the information related to the weather between the flight vehicle 100 and the gateway 40, for example, by using a weather radar or the like mounted on the flight vehicle 100.

The flight vehicle 100 has a function of receiving information related to another flight vehicle. The flight vehicle 100 has a function of receiving the information related to another flight vehicle, for example, via the gateway 40. The flight vehicle 100 has a function of receiving the information related to another flight vehicle, for example, via the communication device 60. The flight vehicle 100 may have a function of receiving the information related to another flight vehicle via the flight vehicle with which the flight vehicle 100 has established a wireless communication connection.

The flight vehicle 100 has a function of transmitting information related to the flight vehicle 100 to another flight vehicle. The flight vehicle 100 has a function of transmitting the information related to the flight vehicle 100 to another flight vehicle, for example, via the gateway 40. The flight vehicle 100 has a function of transmitting the information related to the flight vehicle 100 to another flight vehicle, for example, via the communication device 60. The flight vehicle 100 may have a function of transmitting the information related to the flight vehicle 100 to another flight vehicle via the flight vehicle with which the flight vehicle 100 has established a wireless communication connection.

For example, the control device 150 determines the state of the feeder link established between the flight vehicle 100 and the gateway 40. The control device 150 determines the state of the feeder link, for example, based on the weather between the flight vehicle 100 and the gateway 40. The control device 150 may determine the state of the feeder link based on the data communication of the flight vehicle 100 via the gateway 40.

For example, when determining that the state of the feeder link satisfies a predetermined switching condition, the control device 150 controls the flight vehicle 100 such that the flight vehicle 100 switches a data communication via the gateway 40 to a data communication via the communication device 60. When determining that the state of the feeder link does not satisfy the switching condition, the control device 150 controls the flight vehicle 100 such that the flight vehicle 100 maintains the data communication via the gateway 40.

The weather management device 300 is a device which manages the information related to weather. The weather management device 300 manages the information related to the weather between the flight vehicle 100 and the gateway 40, for example. The weather management device 300 manages the information related to the weather between the flight vehicle and the gateway for each of a plurality of flight vehicles, for example.

The weather management device 300 manages, for example, rainfall amount information indicating a rainfall amount between the flight vehicle and the gateway in a predetermined period. The weather management device 300 manages, for example, snowfall amount information indicating a snowfall amount between the flight vehicle and the gateway in a predetermined period. The weather management device 300 manages, for example, humidity information indicating humidity between the flight vehicle and the gateway. The weather management device 300 may manage wind speed information indicating wind speed in the vicinity of the flight vehicle. The vicinity of the flight vehicle 100 is an area of a predetermined range including the flight vehicle 100.

For example, the weather management device 300 periodically transmits, to the flight vehicle 100, the information related to the weather between the flight vehicle 100 and the gateway 40. The weather management device 300 may transmit, to the flight vehicle 100, the information related to the weather between the flight vehicle 100 and the gateway 40 in response to a request from the flight vehicle 100.

The control device 400 controls the flight vehicle 100. The control device 400 controls, for example, a plurality of flight vehicles. The control device 400 controls the flight vehicle 100, for example, by generating flight vehicle control information for controlling the flight vehicle 100 and transmitting the generated flight vehicle control information to the flight vehicle 100. The control device 400 may have a function similar to that of the control device 150.

In FIG. 1, an example will be mainly described in which the control device 150 controls the flight vehicle 100 based on the information related to the weather between the flight vehicle 100 and the gateway 40. Here, a state where the flight vehicle 100 has not established the feeder link with the gateway 40 will be described as a start state.

The control device 150 controls the flight of the flight vehicle 100 such that the flight vehicle 100 moves to a target position. The target position is set, for example, above an area on the ground to which the flight vehicle 100 provides a wireless communication service.

The control device 150 controls the flight of the flight vehicle 100 such that the flight vehicle 100 starts a turning flight in response to the flight vehicle 100 having moved to the target position. The control device 150 forms the wireless communication area 142 and establishes a service link with the communication device 60 in response to the flight vehicle 100 having started the turning flight.

The control device 150 acquires information related to weather between the flight vehicle 100 and the gateway 40. The control device 150 determines the weather between the flight vehicle 100 and the gateway 40 based on the acquired information. Here, the description will be continued on the assumption that the control device 150 determines that the weather between the flight vehicle 100 and the gateway 40 is favorable.

The control device 150 establishes a feeder link with the gateway 40 in response to determining that the weather between the flight vehicle 100 and the gateway 40 is favorable. In response to establishing the feeder link with the gateway 40, the control device 150 starts providing a wireless communication service using the data communication for backhaul via the gateway 40.

Thereafter, the control device 150 acquires the information related to the weather between the flight vehicle 100 and the gateway 40, and determines the state of the feeder link between the flight vehicle 100 and the gateway 40 based on the acquired information. Here, an example of a case where a rain cloud 50 has moved between the flight vehicle 100 and the gateway 40 with a lapse of time, so that the control device 150 determines that the feeder link is established in a state where the weather between the flight vehicle 100 and the gateway 40 is unfavorable will be described.

In response to determining that the feeder link is established in a state where the weather between the flight vehicle 100 and the gateway 40 is unfavorable, the control device 150 switches the data communication via the gateway 40 to the data communication via the communication device 60. Note that, although the case of establishing the service link with the communication device 60 in advance has been described here, the present invention is not limited thereto, and the control device 150 may establish the service link with the communication device 60 in response to determining that the feeder link is established in a state where the weather between the flight vehicle 100 and the gateway 40 is unfavorable.

A radio wave having high directivity in a high frequency band is used for a feeder link between a flight vehicle which provides a wireless communication service and a gateway on the ground. A radio wave in the high frequency band is easily affected by attenuation due to water or the like. A radio wave having high directivity is easily affected by vibration of an aircraft. Therefore, since the feeder link is easily affected by weather such as rain or wind, the feeder link may be disconnected in the case of unfavorable weather. In addition, there is a case where communication quality of the feeder link is communication quality that cannot be used for the wireless communication service of the flight vehicle.

On the other hand, according to the system 10 according to the present embodiment, when it is determined that the state of the feeder link between the flight vehicle 100 and the gateway 40 satisfies the switching condition, the control device 150 controls the flight vehicle 100 such that the flight vehicle 100 switches the data communication via the gateway 40 to the data communication via the communication device 60 with which the flight vehicle 100 has established the service link. Accordingly, in the system 10 according to the present embodiment, even when the feeder link cannot be used for the wireless communication service of the flight vehicle 100, the flight vehicle 100 can provide the wireless communication service. In addition, a radio wave having lower directivity in a low frequency band compared with the radio wave used for the feeder link is used for the service link between the flight vehicle 100 and the communication device 60. A radio wave in a low frequency band is less affected by the attenuation due to water or the like than a radio wave in a high frequency band. A radio wave having low directivity is less affected by the vibration of an aircraft than a radio wave having high directivity. Therefore, the system 10 according to the present embodiment can provide a wireless communication service in which the flight vehicle 100 is hardly affected by the weather.

Figure 2:
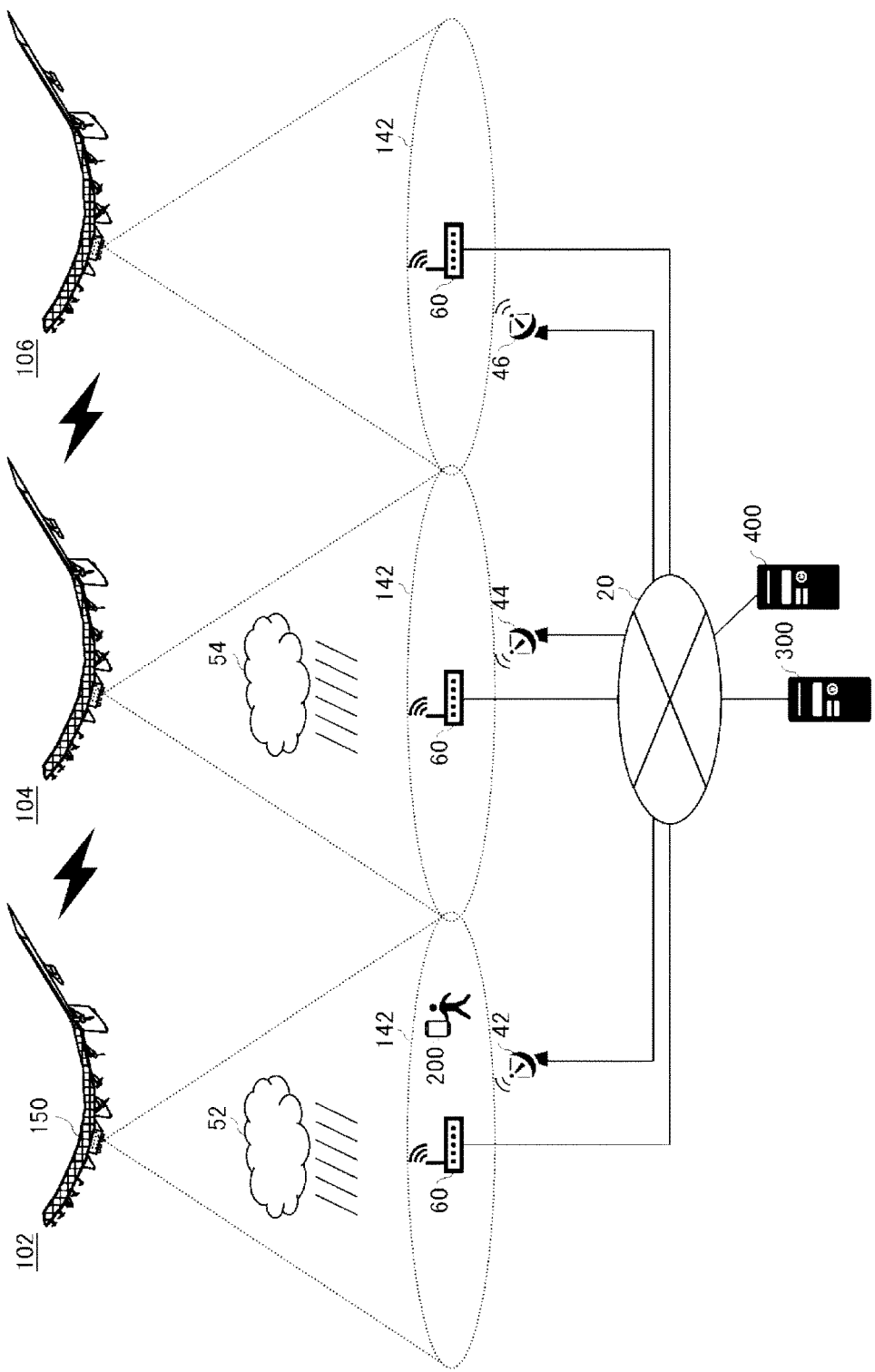
FIG. 2 schematically shows another example of the system 10.

FIG. 2 schematically shows another example of the system 10. FIG. 2 shows an example of a flight vehicle communication network which is constituted by a flight vehicle 102, a flight vehicle 104, and a flight vehicle 106 and in which the wireless communication connection is established between the flight vehicle 102 and the flight vehicle 104 and between the flight vehicle 104 and the flight vehicle 106. The system 10 may include more flight vehicles, and the flight vehicle communication network may be a mesh network. The flight vehicle 102, the flight vehicle 104, and the flight vehicle 106 may have functions similar to that of the flight vehicle 100.

In FIG. 2, an example will be mainly described in which the control device 150 mounted on the flight vehicle 102 controls the flight vehicle 102 based on information related to weather between the flight vehicle 102 and the gateway 42, information related to weather between the flight vehicle 104 and the gateway 44, and information related to weather between the flight vehicle 106 and the gateway 46. Here, a state where feeder links are established between the flight vehicle 102 and the gateway 42, between the flight vehicle 104 and the gateway 44, and between the flight vehicle 106 and the gateway 46 will be described as a start state.

The control device 150 receives, from the flight vehicle 104, the information related to the weather between the flight vehicle 104 and the gateway 44. The control device 150 receives, from the flight vehicle 104, the information related to the weather between the flight vehicle 104 and the gateway 44, for example, via the wireless communication connection between the flight vehicle 102 and the flight vehicle 104.

The control device 150 receives, from the flight vehicle 106, the information related to the weather between the flight vehicle 106 and the gateway 46. The control device 150 receives, from the flight vehicle 106, the information related to the weather between the flight vehicle 106 and the gateway 46, for example, via the wireless communication connection between the flight vehicle 104 and the flight vehicle 106 and the wireless communication connection between the flight vehicle 102 and the flight vehicle 104.

The control device 150 acquires the information related to the weather between the flight vehicle 102 and the gateway 42, and determines the state of the feeder link between the flight vehicle 102 and the gateway 42 based on the acquired information. Here, the description will be continued on the assumption that since a rain cloud 52 is present between the flight vehicle 102 and the gateway 42, the control device 150 determines that the feeder link is established in a state where the weather between the flight vehicle 102 and the gateway 42 is unfavorable.

In response to determining that the feeder link is established in a state where the weather between the flight vehicle 102 and the gateway 42 is unfavorable, the control device 150 determines the weather between the flight vehicle 104 and the gateway 44 based on the received information related to the weather between the flight vehicle 104 and the gateway 44, and determines the weather between the flight vehicle 106 and the gateway 46 based on the received information related to the weather between the flight vehicle 106 and the gateway 46. Here, the description will be continued on the assumption that since the rain cloud 54 is present between the flight vehicle 104 and the gateway 44, the control device 150 determines that the weather between the flight vehicle 104 and the gateway 44 is unfavorable, and the control device 150 determines that the weather between the flight vehicle 106 and the gateway 46 is favorable.

The control device 150 selects a switching destination of a data communication via the gateway 42, based on the determination result of the weather between the flight vehicle 104 and the gateway 44 and the weather between the flight vehicle 106 and the gateway 46. The control device 150 selects, as the switching destination of the data communication via the gateway 42, a data communication via the flight vehicle 106 and the gateway 46 determined to have favorable weather. The control device 150 switches the data communication via the gateway 42 to the data communication via the flight vehicle 104, and the flight vehicle 106 and the gateway 46.

According to the example shown in FIG. 2, when the control device 150 determines that the weather between one flight vehicle constituting the flight vehicle communication network and one gateway with which the one flight vehicle has established the feeder link is unfavorable, the one flight vehicle switches the data communication via the one gateway to a data communication via another flight vehicle, which is determined to have favorable weather between the another flight vehicle and the gateway, among a plurality of flight vehicles constituting the flight vehicle communication network and another gateway with which the another flight vehicle has established a feeder link. Accordingly, when the communication status of the feeder link of any flight vehicle of the plurality of flight vehicles constituting the flight vehicle communication network deteriorates, it is possible to switch to a data communication of another flight vehicle via the feeder link having an excellent communication status, and it is possible to provide, as the entire system 10, a wireless communication service that is hardly affected by the weather.

Figure 3:
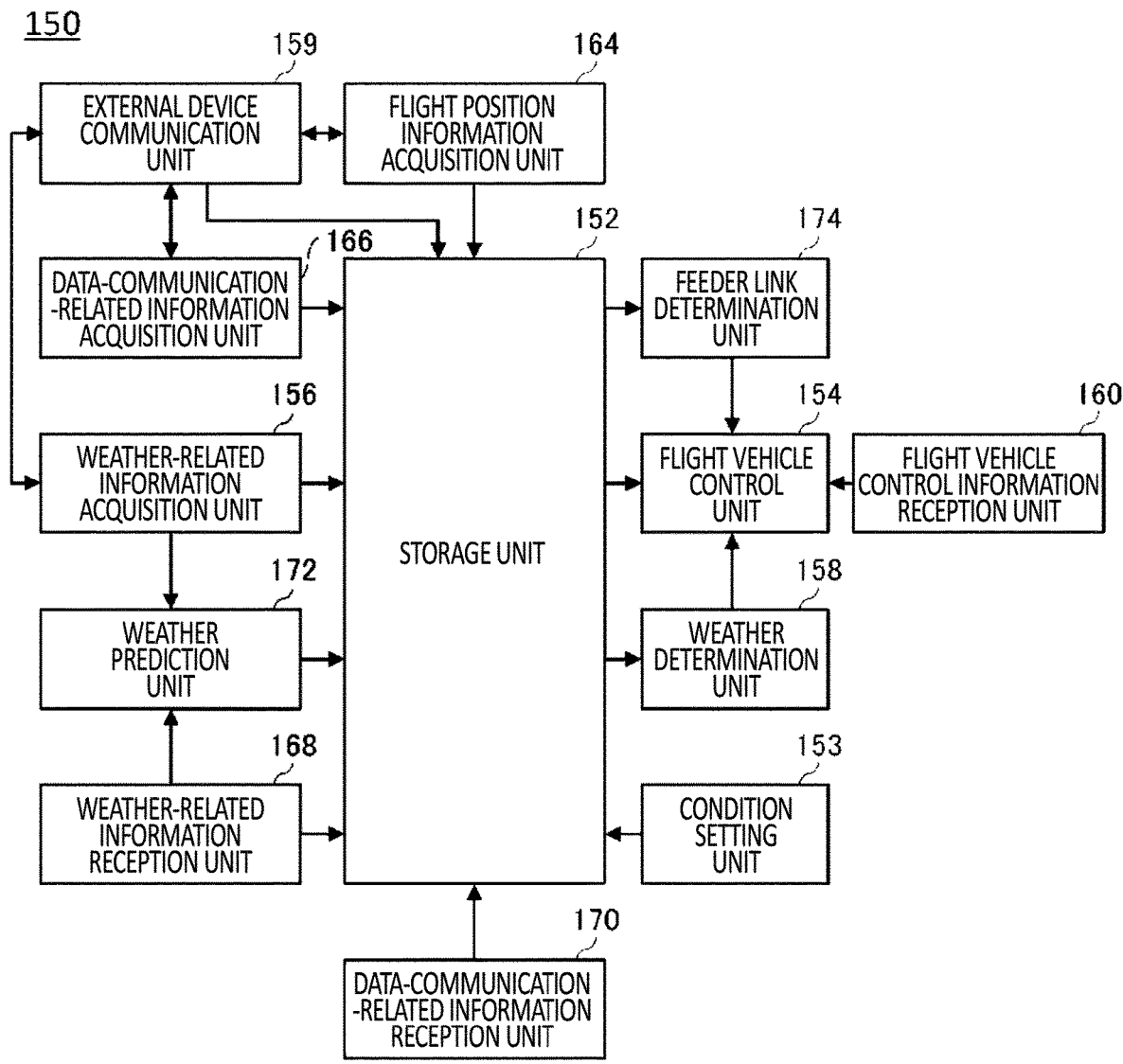
FIG. 3 schematically shows an example of a functional configuration of a control device 150.

FIG. 3 schematically shows an example of a functional configuration of the control device 150. The control device 150 includes a storage unit 152, a condition setting unit 153, a flight vehicle control unit 154, a weather-related information acquisition unit 156, a weather determination unit 158, an external device communication unit 159, a flight vehicle control information reception unit 160, a flight position information acquisition unit 164, a data-communication-related information acquisition unit 166, a weather-related information reception unit 168, a data-communication-related information reception unit 170, a weather prediction unit 172, and a feeder link determination unit 174. Note that the control device 150 is not necessarily required to have all these configurations.

The storage unit 152 stores various types of information. The storage unit 152 stores, for example, target position information indicating the target position of the flight vehicle 100 and flight path information indicating the flight path of the flight vehicle 100. The target position information may indicate a three-dimensional position. The flight path information may indicate a flight path on which the flight vehicle 100 performs the turning flight. The storage unit 152 may store the configuration information of the flight vehicle communication network constituted by a plurality of flight vehicles including the flight vehicle 100. The configuration information includes, for example, identification information of each of the plurality of flight vehicles. The configuration information includes, for example, the target position information and the flight path information of each of the plurality of flight vehicles. The configuration information includes, for example, connection destination information indicating a flight vehicle of a connection destination of the wireless communication connection for each of the plurality of flight vehicles. The storage unit 152 may store installation position information indicating the installation position of the communication device 60.

The condition setting unit 153 sets various conditions. The condition setting unit 153 sets various conditions, for example, by receiving various conditions from a communication terminal possessed by a user of the flight vehicle 100. The user of the flight vehicle 100 is, for example, an administrator who manages the flight vehicle 100. The condition setting unit 153 may set various conditions by receiving an input from the user of the flight vehicle 100 using an input device included in the control device 150. The condition setting unit 153 stores the set various conditions in the storage unit 152.

The condition setting unit 153 sets, for example, a weather condition that is a condition for determining whether the weather between the flight vehicle and the gateway is favorable. The weather condition includes, for example, that a rainfall amount between the flight vehicle and the gateway in a predetermined period is less than a predetermined rainfall amount threshold. The weather condition includes, for example, that the rainfall amount between the flight vehicle and the gateway in the predetermined period is less than the rainfall amount threshold, and that a prediction rainfall amount between the flight vehicle and the gateway in a predetermined period is less than a predetermined prediction rainfall amount threshold. The weather condition includes, for example, that a snowfall amount between the flight vehicle and the gateway in a predetermined period is less than a predetermined snowfall amount threshold. The weather condition includes, for example, that the snowfall amount between the flight vehicle and the gateway in the predetermined period is less than the snowfall amount threshold, and that a prediction snowfall amount between the flight vehicle and the gateway in a predetermined period is less than a predetermined prediction snowfall amount threshold. The weather condition includes, for example, that humidity between the flight vehicle and the gateway is lower than a predetermined humidity threshold. The weather condition may include that wind speed in the vicinity of the flight vehicle is lower than a predetermined wind speed threshold.

The condition setting unit 153 sets, for example, a switching condition that is a condition for determining whether to switch the data communication of the flight vehicle via the gateway. The switching condition includes, for example, that the feeder link between the flight vehicle and the gateway is established in a state where the weather between the flight vehicle and the gateway is unfavorable. The switching condition includes, for example, that the rainfall amount between the flight vehicle and the gateway in a predetermined period is larger than a rainfall amount threshold. The switching condition includes, for example, that the prediction rainfall amount between the flight vehicle and the gateway in a predetermined period is larger than a prediction rainfall amount threshold. The switching condition includes, for example, that the snowfall amount between the flight vehicle and the gateway in a predetermined period is larger than a snowfall amount threshold. The switching condition includes, for example, that the prediction snowfall amount between the flight vehicle and the gateway in a predetermined period is larger than a prediction snowfall amount threshold. The switching condition includes, for example, that the humidity between the flight vehicle and the gateway is higher than a humidity threshold. The switching condition may include that the wind speed in the vicinity of the flight vehicle is higher than a wind speed threshold.

The switching condition may include that the feeder link between the flight vehicle and the gateway is established in a state where the communication quality of the feeder link is poor. The switching condition includes, for example, that the throughput of the data communication of the flight vehicle via the gateway is lower than a predetermined throughput threshold. The switching condition includes, for example, that the reception radio wave intensity of the radio wave received from the gateway by the flight vehicle is lower than a predetermined reception radio wave intensity threshold. The switching condition may include that a bit error rate (BER) of the signal received from the gateway by the flight vehicle is higher than a predetermined bit error rate threshold.

The condition setting unit 153 sets, for example, various thresholds included in various conditions. The condition setting unit 153 sets, for example, the rainfall amount threshold. The condition setting unit 153 sets, for example, the prediction rainfall amount threshold. The condition setting unit 153 sets, for example, the snowfall amount threshold. The condition setting unit 153 sets, for example, the prediction snowfall amount threshold. The condition setting unit 153 sets, for example, the humidity threshold value. The condition setting unit 153 sets, for example, the wind speed threshold. The condition setting unit 153 sets, for example, the throughput threshold. The condition setting unit 153 sets, for example, the reception radio wave intensity threshold. The condition setting unit 153 may set the bit error rate threshold. The condition setting unit 153 stores the set various thresholds in the storage unit 152.

The flight vehicle control unit 154 controls the flight vehicle 100. The flight vehicle control unit 154 controls the flight vehicle 100, for example, by generating flight vehicle control information.

The flight vehicle control unit 154 controls, for example, the flight of the flight vehicle 100. The flight vehicle control unit 154 controls, for example, the communication of the flight vehicle 100.

For example, the flight vehicle control unit 154 controls the flight of the flight vehicle 100 such that the flight vehicle moves to the target position indicated by the target position information of the flight vehicle 100 stored in the storage unit 152 and flies along the flight path indicated by the flight path information. In response to the flight vehicle 100 having moved to the target position, the flight vehicle control unit 154 forms the wireless communication area 142 and establishes a service link with the communication device 60. When a plurality of communication devices 60 are present in the wireless communication area 142 of the flight vehicle 100, the flight vehicle control unit 154 may establish a plurality of service links with the plurality of communication devices 60, respectively. The flight vehicle control unit 154 may establish a wireless communication connection with a flight vehicle constituting the flight vehicle communication network together with the flight vehicle 100, based on the connection destination information stored in the storage unit 152.

The weather-related information acquisition unit 156 acquires weather-related information related to the weather between the flight vehicle 100 and the gateway 40. The weather-related information acquisition unit 156 acquires the weather-related information of the flight vehicle 100, for example, by using a weather radar or the like mounted on the flight vehicle 100. The weather-related information acquisition unit 156 stores the acquired weather-related information of the flight vehicle 100 in the storage unit 152.

The weather-related information acquisition unit 156 acquires the weather-related information of the flight vehicle 100, for example, in response to the formation of the wireless communication area 142. The weather-related information acquisition unit 156 may periodically acquire the weather-related information of the flight vehicle 100.

The weather-related information includes, for example, rainfall amount information indicating a rainfall amount between the flight vehicle and the gateway in a predetermined period. The weather-related information includes, for example, snowfall amount information indicating a snowfall amount between the flight vehicle and the gateway in a predetermined period. The weather-related information includes humidity information indicating humidity between the flight vehicle and the gateway. The weather-related information may include, for example, wind speed information indicating wind speed in the vicinity of the flight vehicle.

The weather determination unit 158 determines the weather between the flight vehicle and the gateway. The weather determination unit 158 determines, for example, the weather between the flight vehicle 100 and the gateway 40. For example, the weather determination unit 158 determines whether the weather between the flight vehicle 100 and the gateway 40 satisfies the weather condition stored in the storage unit 152, based on the weather-related information of the flight vehicle 100 stored in the storage unit 152.

For example, when the weather determination unit 158 determines that the weather between the flight vehicle 100 and the gateway 40 satisfies the weather condition, the flight vehicle control unit 154 establishes a feeder link between the flight vehicle 100 and the gateway 40, and provides a wireless communication service by using the data communication via the gateway 40. When the weather determination unit 158 determines that the weather between the flight vehicle 100 and the gateway 40 does not satisfy the weather condition, the flight vehicle control unit 154 provides a wireless communication service by using the data communication via the communication device 60. For example, the flight vehicle control unit 154 decides a frequency band to be allocated to the data communication via the communication device 60, according to the utilization rate of the frequency band allocated to the data communication of the flight vehicle 100 via the service link.

When a wireless communication service is provided by using the data communication via the communication device 60, the flight vehicle control unit 154 performs control to perform the data communication, for example, by using a network slicing technology. The network slicing technology is a technology of dividing a network into slices that are virtual logical networks for respective communication services. The flight vehicle control unit 154 may perform control to allocate a slice to the communication device 60 such that the communication of the communication device 60 is prioritized over the communication of the user terminal 200 in the wireless communication area 142. For example, the flight vehicle control unit 154 performs control to allocate the slice corresponding to an ultra-reliable and low latency communications (URLLC) service to the communication device 60. For example, the flight vehicle control unit 154 performs control to allocate the slice corresponding to an enhanced mobile broadband (eMBB) service to the communication device 60.

The external device communication unit 159 communicates with an external device. The external device communication unit 159 communicates with, for example, a flight vehicle constituting the flight vehicle communication network together with the flight vehicle 100. The external device communication unit 159 communicates with, for example, each of a plurality of flight vehicles constituting the flight vehicle communication network together with the flight vehicle 100. The external device communication unit 159 communicates with, for example, the weather management device 300. The external device communication unit 159 may communicate with the control device 400.

The external device communication unit 159 communicates with the external device, for example, via the gateway 40 with which the flight vehicle 100 has established the feeder link. The external device communication unit 159 communicates with the external device, for example, via the communication device 60 with which the flight vehicle 100 has established the service link. The external device communication unit 159 may communicate with the external device via the flight vehicle with which the flight vehicle 100 has established a wireless communication connection.

For example, the external device communication unit 159 receives, from the flight vehicle constituting the flight vehicle communication network together with the flight vehicle 100, the feeder link connection information indicating whether the flight vehicle has established the feeder link with the gateway. For example, the external device communication unit 159 receives the feeder link connection information of the flight vehicle from each of the plurality of flight vehicles constituting the flight vehicle communication network together with the flight vehicle 100. The external device communication unit 159 may receive, from the control device 400, the feeder link connection information of the flight vehicle constituting the flight vehicle communication network together with the flight vehicle 100. The external device communication unit 159 may receive, from the control device 400, the feeder link connection information of each of the plurality of flight vehicles constituting the flight vehicle communication network together with the flight vehicle 100. The external device communication unit 159 stores the received feeder link connection information in the storage unit 152.

When the weather determination unit 158 determines that the weather between the flight vehicle 100 and the gateway 40 does not satisfy the weather condition, the flight vehicle control unit 154 may control the communication of the flight vehicle 100 based on the feeder link connection information stored in the storage unit 152. For example, the flight vehicle control unit 154 provides a wireless communication service by using a data communication via another flight vehicle constituting the flight vehicle communication network together with the flight vehicle 100 and another gateway with which the another flight vehicle has established the feeder link.

The weather-related information acquisition unit 156 may acquire the weather-related information of the flight vehicle 100 by receiving the weather-related information of the flight vehicle 100 from the weather management device 300. The weather-related information acquisition unit 156 receives the weather-related information of the flight vehicle 100, for example, from the weather management device 300 via the gateway 40. The weather-related information acquisition unit 156 receives the weather-related information of the flight vehicle 100, for example, from the weather management device 300 via the communication device 60. The weather-related information acquisition unit 156 may receive the weather-related information of the flight vehicle 100 from the weather management device 300 via another flight vehicle constituting the flight vehicle communication network together with the flight vehicle 100 and another gateway with which the another flight vehicle has established the feeder link.

The weather-related information acquisition unit 156 may acquire the weather-related information of the flight vehicle 100 in response to the request received from an external device by the external device communication unit 159. The external device communication unit 159 may transmit, to the external device, the weather-related information of the flight vehicle 100 acquired by the weather-related information acquisition unit 156. The external device communication unit 159 may request the weather management device 300 for the weather-related information of the flight vehicle 100.

The flight vehicle control information reception unit 160 receives the flight vehicle control information of the flight vehicle 100 from the control device 400. The flight vehicle control information reception unit 160 receives the flight vehicle control information of the flight vehicle 100, for example, from the control device 400 via the gateway 40. The flight vehicle control information reception unit 160 receives the flight vehicle control information of the flight vehicle 100, for example, from the control device 400 via the communication device 60. The flight vehicle control information reception unit 160 may receive the flight vehicle control information of the flight vehicle 100 from the control device 400 via another flight vehicle constituting the flight vehicle communication network together with the flight vehicle 100 and another gateway with which the another flight vehicle has established the feeder link. The flight vehicle control unit 154 may control the flight vehicle 100 in accordance with the flight vehicle control information of the flight vehicle 100 received by the flight vehicle control information reception unit 160.

The flight position information acquisition unit 164 acquires the flight position information indicating the flight position of the flight vehicle 100. For example, the flight position information acquisition unit 164 periodically acquires the flight position information of the flight vehicle 100. The flight position information acquisition unit 164 may acquire the flight position information of the flight vehicle 100 in response to the request received from an external device by the external device communication unit 159. The flight position information acquisition unit 164 stores the acquired flight position information of the flight vehicle 100 in the storage unit 152. The external device communication unit 159 may transmit, to the external device, the flight position information of the flight vehicle 100 acquired by the flight position information acquisition unit 164.

For the flight vehicle constituting the flight vehicle communication network together with the flight vehicle 100, the flight position information acquisition unit 164 may receive the flight position information indicating the flight position of the flight vehicle. For each of the plurality of flight vehicles constituting the flight vehicle communication network together with the flight vehicle 100, the flight position information acquisition unit 164 may receive the flight position information indicating the flight position of the flight vehicle. The external device communication unit 159 may request an external device for the position information of the flight vehicle.

The data-communication-related information acquisition unit 166 acquires the data-communication-related information related to the data communication of the flight vehicle 100. For example, the data-communication-related information acquisition unit 166 periodically acquires the data-communication-related information of the flight vehicle 100. The data-communication-related information acquisition unit 166 may acquire the data-communication-related information of the flight vehicle 100 in response to the request received from an external device by the external device communication unit 159. The data-communication-related information acquisition unit 166 stores the acquired data-communication-related information of the flight vehicle 100 in the storage unit 152. The external device communication unit 159 may transmit, to the external device, the data-communication-related information of the flight vehicle 100 acquired by the data-communication-related information acquisition unit 166.

The data-communication-related information acquisition unit 166 acquires, for example, the data-communication-related information related to the data communication of the flight vehicle 100 via the gateway 40. The data-communication-related information acquisition unit 166 may acquire the data-communication-related information related to the data communication of the flight vehicle 100 via the communication device 60.

The data-communication-related information includes, for example, throughput information indicating the throughput of the data communication of the flight vehicle via the gateway. The data-communication-related information includes, for example, reception radio wave intensity information indicating the reception radio wave intensity of the radio wave received from the gateway by the flight vehicle. The data-communication-related information includes, for example, bit error rate information indicating the bit error rate of the signal received from the gateway by the flight vehicle.

The data-communication-related information includes, for example, throughput information indicating the throughput of the data communication of the flight vehicle via the communication device. The data-communication-related information includes, for example, reception radio wave intensity information indicating the reception radio wave intensity of the radio wave received from the communication device by the flight vehicle. The data-communication-related information may include bit error rate information indicating the bit error rate of the signal received from the communication device by the flight vehicle.

The weather-related information reception unit 168 receives the weather-related information related to the weather between the flight vehicle constituting the flight vehicle communication network together with the flight vehicle 100 and the gateway with which the flight vehicle has established the feeder link, based on the feeder link connection information stored in the storage unit 152. For example, for each of the plurality of flight vehicles constituting the flight vehicle communication network together with the flight vehicle 100, the weather-related information reception unit 168 receives the weather-related information related to the weather between the flight vehicle and the gateway with which the flight vehicle has established the feeder link, based on the feeder link connection information stored in the storage unit 152.

The weather-related information reception unit 168 receives the weather-related information of the flight vehicle from an external device. The external device communication unit 159 may request the external device for the weather-related information of the flight vehicle.

The weather-related information reception unit 168 receives the weather-related information of the flight vehicle, for example, via the gateway 40. The weather-related information reception unit 168 receives the weather-related information of the flight vehicle, for example, via the communication device 60. The weather-related information reception unit 168 may receive the weather-related information of the flight vehicle via another flight vehicle constituting the flight vehicle communication network together with the flight vehicle 100 and another gateway with which the another flight vehicle has established the feeder link.

The weather determination unit 158 may determine the weather between the flight vehicle constituting the flight vehicle communication network together with the flight vehicle 100 and the gateway with which the flight vehicle has established the feeder link, based on the feeder link connection information stored in the storage unit 152. For each of the plurality of flight vehicles constituting the flight vehicle communication network together with the flight vehicle 100, the weather determination unit 158 may determine the weather between the flight vehicle and the gateway with which the flight vehicle has established the feeder link, based on the feeder link connection information stored in the storage unit 152. For example, the weather determination unit 158 determines whether the weather between the flight vehicle and the gateway satisfies the weather condition stored in the storage unit 152, based on the weather-related information of the flight vehicle stored in the storage unit 152.

The data-communication-related information reception unit 170 receives the data-communication-related information related to the data communication of the flight vehicle constituting the flight vehicle communication network together with the flight vehicle 100, via the gateway with which the flight vehicle has established the feeder link, based on the feeder link connection information stored in the storage unit 152. For example, for each of the plurality of flight vehicles constituting the flight vehicle communication network together with the flight vehicle 100, the data-communication-related information reception unit 170 receives the data-communication-related information related to the data communication of the flight vehicle via the gateway with which the flight vehicle has established the feeder link, based on the feeder link connection information stored in the storage unit 152.

The data-communication-related information reception unit 170 receives the data-communication-related information of the flight vehicle from an external device. The external device communication unit 159 may request the external device for the data-communication-related information of the flight vehicle.

The data-communication-related information reception unit 170 receives the data-communication-related information of the flight vehicle, for example, via the gateway 40. The data-communication-related information reception unit 170 receives the data-communication-related information of the flight vehicle, for example, via the communication device 60. The data-communication-related information reception unit 170 may receive the data-communication-related information of the flight vehicle via another flight vehicle constituting the flight vehicle communication network together with the flight vehicle 100 and another gateway with which the another flight vehicle has established the feeder link.

The weather prediction unit 172 predicts the weather between the flight vehicle and the gateway. The weather prediction unit 172 predicts, for example, the weather between the flight vehicle 100 and the gateway 40. The weather prediction unit 172 predicts the weather between the flight vehicle 100 and the gateway 40, for example, based on the weather-related information of the flight vehicle 100 acquired by the weather-related information acquisition unit 156.

For example, the weather prediction unit 172 predicts the weather between the flight vehicle constituting the flight vehicle communication network together with the flight vehicle 100 and the gateway with which the flight vehicle has established the feeder link, based on the feeder link connection information stored in the storage unit 152. For example, for each of the plurality of flight vehicles constituting the flight vehicle communication network together with the flight vehicle 100, the weather prediction unit 172 predicts the weather between the flight vehicle and the gateway with which the flight vehicle has established the feeder link, based on the feeder link connection information stored in the storage unit 152. The weather prediction unit 172 predicts the weather between the flight vehicle and the gateway, for example, based on the weather-related information of the flight vehicle received by the weather-related information reception unit 168.

The weather prediction unit 172 predicts, for example, a rainfall amount between the flight vehicle and the gateway in a predetermined period. The weather prediction unit 172 stores the predicted rainfall amount as the prediction rainfall amount in the storage unit 152. The weather prediction unit 172 may predict a snowfall amount between the flight vehicle and the gateway in a predetermined period. The weather prediction unit 172 stores the predicted snowfall amount as the prediction snowfall amount in the storage unit 152.

The feeder link determination unit 174 determines the state of the feeder link established between the flight vehicle 100 and the gateway 40. For example, the feeder link determination unit 174 periodically determines the state of the feeder link. The feeder link determination unit 174 determines the state of the feeder link, for example, in response to the weather-related information acquisition unit 156 having acquired the weather-related information of the flight vehicle 100. The feeder link determination unit 174 determines the state of the feeder link, for example, in response to the data-communication-related information acquisition unit 166 having acquired the data-communication-related information of the flight vehicle 100. The feeder link determination unit 174 may determine the state of the feeder link in response to a request from the control device 400.

The feeder link determination unit 174 determines the state of the feeder link, for example, by determining whether the state of the feeder link satisfies the switching condition stored in the storage unit 152. The feeder link determination unit 174 determines whether the state of the feeder link satisfies the switching condition, for example, based on the weather-related information of the flight vehicle 100 stored in the storage unit 152. The feeder link determination unit 174 determines whether the state of the feeder link satisfies the switching condition, for example, based on the prediction result of the weather prediction unit 172 stored in the storage unit 152. The feeder link determination unit 174 may determine whether the state of the feeder link satisfies the switching condition, based on the data-communication-related information of the flight vehicle 100 stored in the storage unit 152.

For example, when the feeder link determination unit 174 determines that the state of the feeder link satisfies the switching condition stored in the storage unit 152, the flight vehicle control unit 154 switches the data communication via the gateway 40 to the data communication via the communication device 60. When a plurality of communication devices 60 are present in the wireless communication area 142 of the flight vehicle 100, the flight vehicle control unit 154 may switch the data communication via the gateway 40 to a plurality of data communications via the plurality of respective communication devices 60.

When a plurality of communication devices 60 are present in the wireless communication area 142 of the flight vehicle 100, the flight vehicle control unit 154 may select the switching destination of the data communication via the gateway 40 from the plurality of communication devices 60. The flight vehicle control unit 154 may switch the data communication via the gateway 40 to the data communication via the communication device 60 selected as the switching destination of the data communication via the gateway 40.

The flight vehicle control unit 154 selects the switching destination of the data communication via the gateway 40, for example, based on the flight position of the flight vehicle 100 and the installation positions of the plurality of communication devices 60 stored in the storage unit 152. For example, the flight vehicle control unit 154 selects, as the switching destination of the data communication via the gateway 40, the communication device 60 having the shortest distance from the flight vehicle 100, among the plurality of communication devices 60.

The flight vehicle control unit 154 may select the switching destination of the data communication via the gateway 40, based on the data-communication-related information of the flight vehicle 100 stored in the storage unit 152. For example, the flight vehicle control unit 154 selects, as the switching destination of the data communication via the gateway 40, the communication device 60 having the highest throughput of the data communication with the flight vehicle 100, among the plurality of communication devices 60. For example, the flight vehicle control unit 154 selects, as the switching destination of the data communication via the gateway 40, the communication device 60 having the highest reception radio wave intensity of the flight vehicle 100, among the plurality of communication devices 60. The flight vehicle control unit 154 may select, as the switching destination of the data communication via the gateway 40, the communication device 60 having the lowest bit error of the flight vehicle 100, among the plurality of communication devices 60.

When the feeder link determination unit 174 determines that the state of the feeder link satisfies the switching condition stored in the storage unit 152, the flight vehicle control unit 154 may switch the data communication via the gateway 40 to a data communication via another flight vehicle, which constitutes the flight vehicle communication network together with the flight vehicle 100 and for which the weather determination unit 158 determines that the weather satisfies the weather condition stored in the storage unit 152, and another gateway with which the another flight vehicle has established the feeder link. When another flight vehicle for which the weather determination unit 158 determines that the weather satisfies the weather condition does not exist, the flight vehicle control unit 154 may switch the data communication via the gateway 40 to the data communication via the communication device 60.

For example, when there are a plurality of other flight vehicles which constitute the flight vehicle communication network together with the flight vehicle 100 and for which the weather determination unit 158 determines that the weather satisfies the weather condition, the flight vehicle control unit 154 selects the switching destination of the data communication via the gateway 40 from the plurality of other flight vehicles. The flight vehicle control unit 154 may switch the data communication via the gateway 40 to the data communication via another flight vehicle selected as the switching destination of the data communication of the flight vehicle 100 via the gateway 40 and another gateway with which the another flight vehicle has established the feeder link.

The flight vehicle control unit 154 selects the switching destination of the data communication via the gateway 40, for example, based on the flight position of the flight vehicle 100 and the flight positions of a plurality of other flight vehicles stored in the storage unit 152. For example, the flight vehicle control unit 154 selects, as the switching destination of the data communication via the gateway 40, another flight vehicle, which has the shortest distance from the flight vehicle 100, among the plurality of flight vehicles.

The flight vehicle control unit 154 may select the switching destination of the data communication via the gateway 40, based on the data-communication-related information of a plurality of other flight vehicles stored in the storage unit 152. For example, the flight vehicle control unit 154 selects, as the switching destination of the data communication via the gateway 40, another flight vehicle, which has the highest throughput of the data communication via the gateway, among the plurality of flight vehicles. For example, the flight vehicle control unit 154 selects, as the switching destination of the data communication via the gateway 40, another flight vehicle, which has the highest reception radio wave intensity of the radio wave received from the gateway, among the plurality of flight vehicles. The flight vehicle control unit 154 may select, as the switching destination of the data communication via the gateway 40, another flight vehicle, which has the lowest bit error rate of the signal received from the gateway, among the plurality of flight vehicles.

Figure 4:
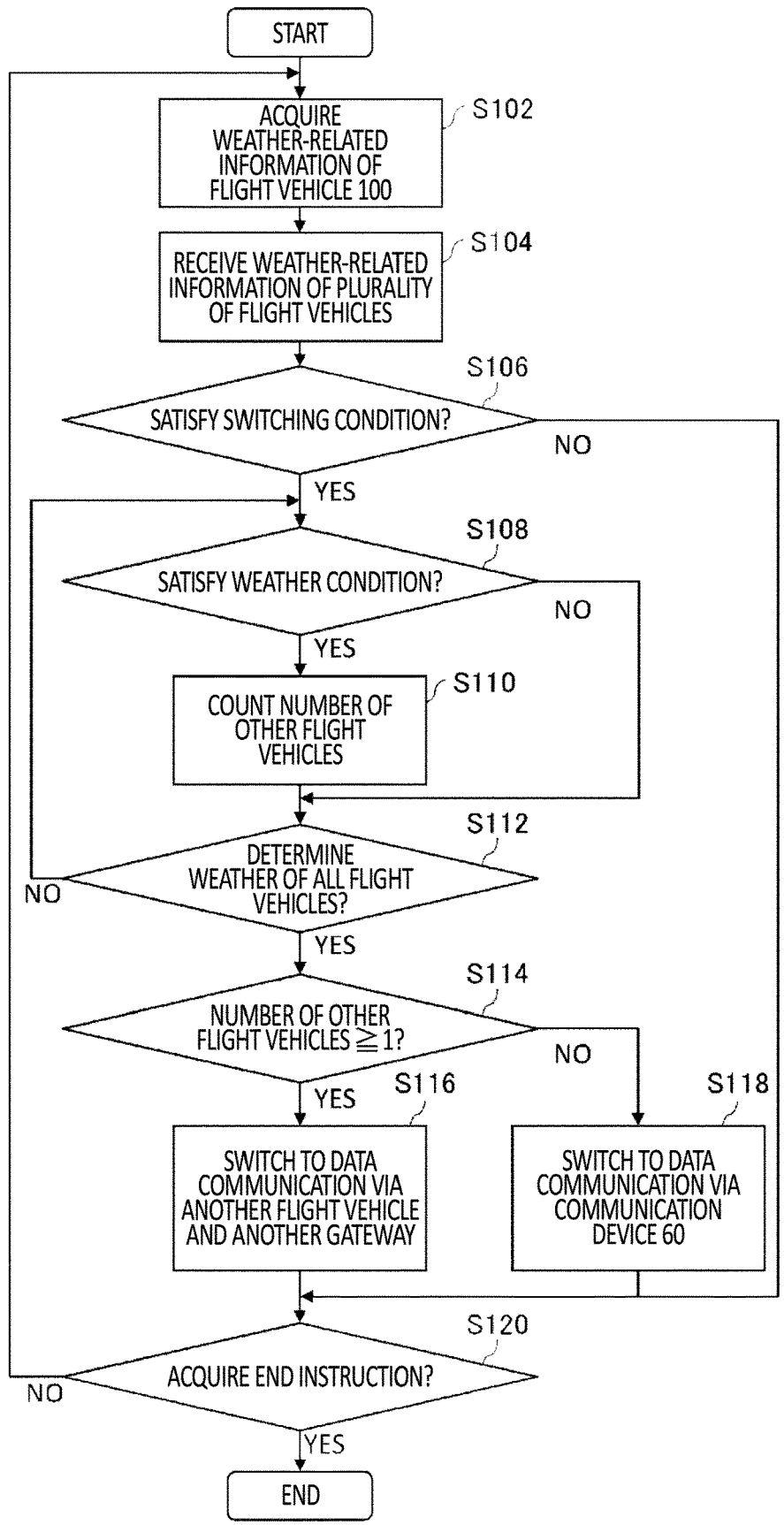
FIG. 4 is an explanatory diagram for explaining an example of a processing flow of the control device 150.

FIG. 4 is an explanatory diagram for explaining an example of a processing flow of the control device 150. In FIG. 4, a state where the feeder link is established between the flight vehicle 100 and the gateway 40 will be described as a start state.

In step (the step may be abbreviated as S) 102, the weather-related information acquisition unit 156 acquires the weather-related information of the flight vehicle 100. In S104, for each of the plurality of flight vehicles constituting the flight vehicle communication network together with the flight vehicle 100, the weather-related information reception unit 168 receives the weather-related information of the flight vehicle.

In S106, the feeder link determination unit 174 determines whether the state of the feeder link established between the flight vehicle 100 and the gateway 40 satisfies the switching condition stored in the storage unit 152, based on the weather-related information of the flight vehicle 100 acquired by the weather-related information acquisition unit 156 in S102. If the state of the feeder link satisfies the switching condition, the process proceeds to S108. If the state of the feeder link does not satisfy the switching condition, the process proceeds to S120.

In S108, the weather determination unit 158 determines whether the weather between the flight vehicle constituting the flight vehicle communication network together with the flight vehicle 100 and the gateway with which the flight vehicle has established the feeder link satisfies the weather condition stored in the storage unit 152, based on the weather-related information of the flight vehicle received by the weather-related information reception unit 168 in S104. If the weather satisfies the weather condition, the process proceeds to S110. If the weather does not satisfy the weather condition, the process proceeds to S112.

In S110, the weather determination unit 158 counts the number of other flight vehicles satisfying the weather condition. In S112, the weather determination unit 158 determines whether the weather of all the flight vehicles constituting the flight vehicle communication network together with the flight vehicle 100 has been determined. If the weather determination unit 158 has determined the weather of all the flight vehicles constituting the flight vehicle communication network together with the flight vehicle 100, the process proceeds to S114. If the weather determination unit 158 has not determined the weather of all the flight vehicles constituting the flight vehicle communication network together with the flight vehicle 100, the process returns to S108.

In S114, the weather determination unit 158 determines whether the number of other flight vehicles satisfying the weather condition is 1 or more. If the number of other flight vehicles satisfying the weather condition is 1 or more, the process proceeds to S116. If the number of other flight vehicles satisfying the weather condition is 0, the process proceeds to S118.

In S116, the flight vehicle control unit 154 switches the data communication via the gateway 40 to a data communication via another flight vehicle for which the weather determination unit 158 determines in S108 that the weather satisfies the weather condition, and another gateway with which the another flight vehicle has established the feeder link. If the number of other flight vehicles satisfying the weather condition is 2 or more, the flight vehicle control unit 154 switches the data communication via the gateway 40 to a data communication via another flight vehicle selected from a plurality of other flight vehicles and another gateway. In S118, the flight vehicle control unit 154 switches the data communication via the gateway 40 to the data communication via the communication device 60 having established the service link.

In S120, the control device 150 determines whether an end instruction has been acquired. The control device 150 acquires the end instruction, for example, by receiving the end instruction from the communication terminal possessed by the user of the flight vehicle 100. The control device 150 may acquire the end instruction by receiving the input of the user of the flight vehicle 100 using the input device included in the control device 150. If the control device 150 has not received the end instruction, the process returns to S102. If the control device 150 has acquired the end instruction, the processing ends.

Figure 5:
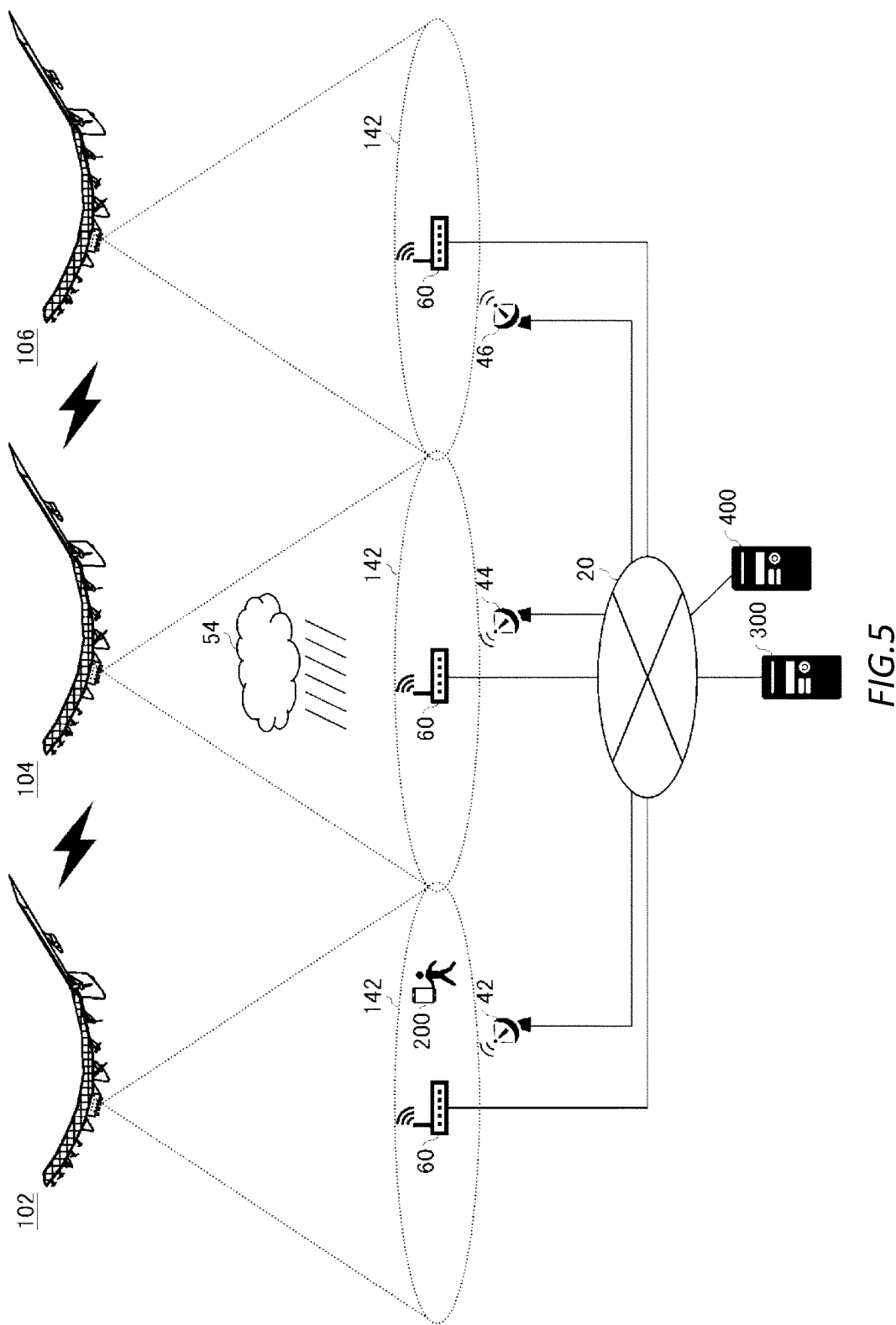
FIG. 5 schematically shows another example of the system 10.

FIG. 5 schematically shows another example of the system 10. In FIG. 5, an example will be mainly described in which the control device 400 controls the flight vehicle 102, the flight vehicle 104, and the flight vehicle 106 based on the weather-related information of the flight vehicle 102, the weather-related information of the flight vehicle 104, and the weather-related information of the flight vehicle 106. Here, a state where no feeder link is established between the flight vehicle 102 and the gateway 42, between the flight vehicle 104 and the gateway 44, and between the flight vehicle 106 and the gateway 46 will be described as a start state.

The control device 400 controls the flight vehicle 102, the flight vehicle 104, and the flight vehicle 106 to move to respective target positions. The flight vehicle 102, the flight vehicle 104, and the flight vehicle 106 start moving toward the respective target positions under the control of the control device 400.

The control device 400 causes the flight vehicle 102, the flight vehicle 104, and the flight vehicle 106 to construct a flight vehicle communication network in response to the flight vehicle 102, the flight vehicle 104, and the flight vehicle 106 having moved to the respective target positions. Here, the description will be continued on the assumption that the control device 400 constructs a flight vehicle communication network in which the wireless communication connections are established between the flight vehicle 102 and the flight vehicle 104 and between the flight vehicle 104 and the flight vehicle 106.

After the construction of the flight vehicle communication network, the control device 400 controls the flight vehicle 102, the flight vehicle 104, and the flight vehicle 106 to form the wireless communication area 142. The flight vehicle 102, the flight vehicle 104, and the flight vehicle 106 form the wireless communication area 142 under the control of the control device 400.

The control device 400 receives the weather-related information of the flight vehicle 102, the weather-related information of the flight vehicle 104, and the weather-related information of the flight vehicle 106. The control device 400 determines each of the weather between the flight vehicle 102 and the gateway 42, the weather between the flight vehicle 104 and the gateway 44, and the weather between the flight vehicle 106 and the gateway 46 based on the received weather-related information. Here, the description will be continued on the assumption that the control device 400 determines that the weather between the flight vehicle 102 and the gateway 42 and the weather between the flight vehicle 106 and the gateway 46 satisfy the weather condition, and since the rain cloud 54 is present between the flight vehicle 104 and the gateway 44, the control device 400 determines that the weather between the flight vehicle 104 and the gateway 44 does not satisfy the weather condition.

In response to determining that the weather between the flight vehicle 102 and the gateway 42 satisfies the weather condition, the control device 400 controls the flight vehicle 102 to establish the feeder link with the gateway 42. Under the control of the control device 400, the flight vehicle 102 establishes the feeder link with the gateway 42 and starts providing a wireless communication service using the data communication via the gateway 42.

In response to determining that the weather between the flight vehicle 106 and the gateway 46 satisfies the weather condition, the control device 400 controls the flight vehicle 106 to establish the feeder link with the gateway 46. Under the control of the control device 400, the flight vehicle 106 establishes the feeder link with the gateway 46 and starts providing a wireless communication service using the data communication via the gateway 46.

In response to determining that the weather between the flight vehicle 104 and the gateway 44 does not satisfy the weather condition, the control device 400 controls the flight vehicle 104 to provide a wireless communication service by using the data communication via the flight vehicle, among the flight vehicle 102 and the flight vehicle 106 constituting the flight vehicle communication network, for which it is determined that the weather satisfies the weather condition and the gateway with which the flight vehicle has established the feeder link. Here, the description will be continued on the assumption that the control device 400 controls the flight vehicle 104 to provide a wireless communication service by using the data communication via the flight vehicle 106 and the gateway 46. Under the control of the control device 400, the flight vehicle 104 starts providing the wireless communication service using the data communication via the flight vehicle 106 and the gateway 46.

According to the example illustrated in FIG. 5, for each of the plurality of flight vehicles constituting the flight vehicle communication network, the control device 400 determines the weather between the flight vehicle and the gateway. For the flight vehicle for which it is determined that the weather satisfies the weather condition among the plurality of flight vehicles, the control device 400 establishes a gateway, and controls the flight vehicle to provide a wireless communication service by using the data communication via the gateway. For the flight vehicle for which it is determined that the weather does not satisfy the weather condition among the plurality of flight vehicles, the control device 400 controls the flight vehicle to provide a wireless communication service by using the data communication via another flight vehicle among the plurality of flight vehicles for which it is determined that the weather satisfies the weather condition, and another gateway with which the another flight vehicle has established the feeder link. Accordingly, when the weather between the gateway and any flight vehicle of the plurality of flight vehicles constituting the flight vehicle communication network is unfavorable, the flight vehicle can provide a wireless communication service by using the data communication via the feeder link of another flight vehicle having an excellent communication status, so that the system 10 as a whole can provide the wireless communication service that is hardly affected by the weather.

Figure 6:
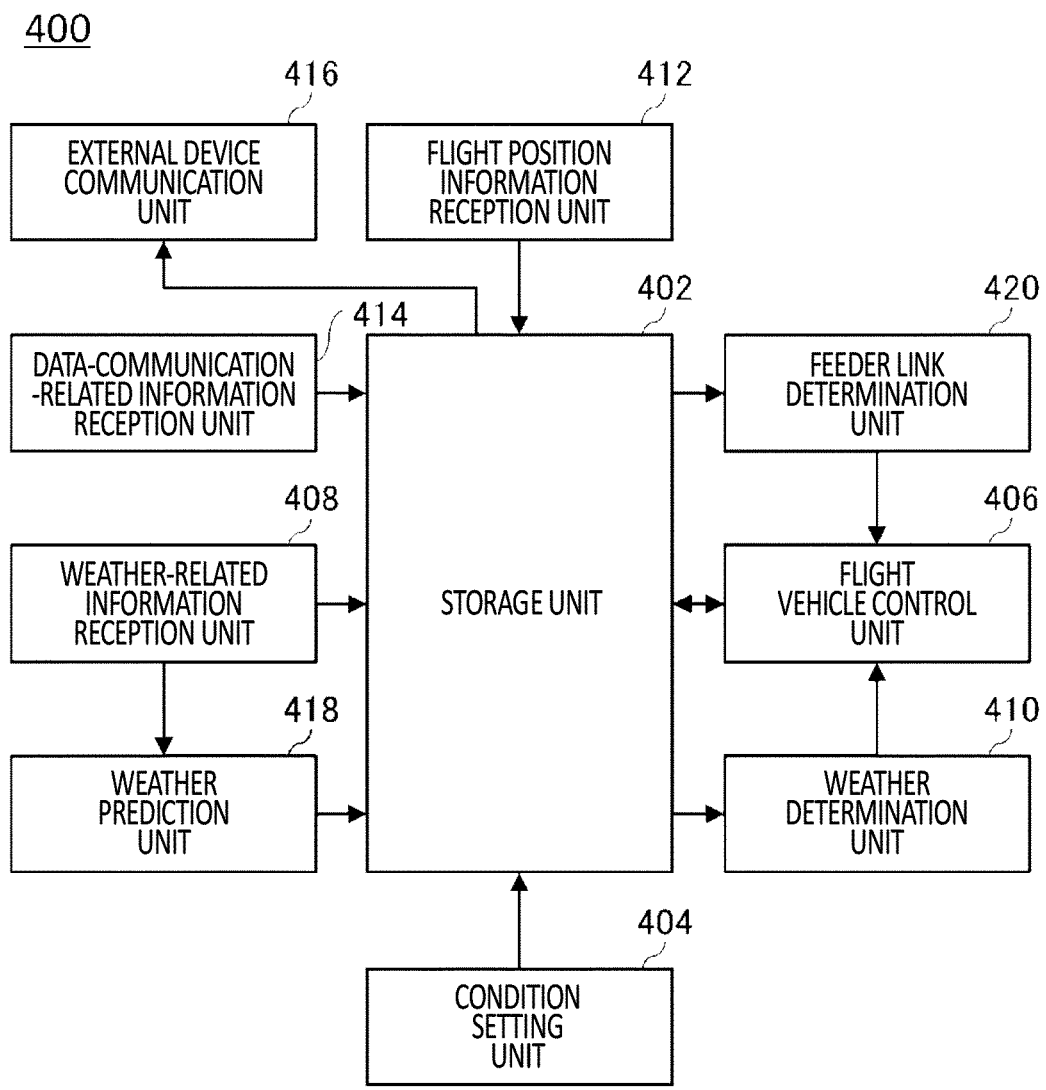
FIG. 6 schematically shows an example of a functional configuration of a control device 400.

FIG. 6 schematically shows an example of a functional configuration of the control device 400. The control device 400 includes a storage unit 402, a condition setting unit 404, a flight vehicle control unit 406, a weather-related information reception unit 408, a weather determination unit 410, a flight position information reception unit 412, a data-communication-related information reception unit 414, an external device communication unit 416, a weather prediction unit 418, and a feeder link determination unit 420. Note that the control device 400 is not necessarily required to have all these configurations.

The storage unit 402 stores various types of information. The storage unit 402 stores the configuration information of the flight vehicle communication network constituted by a plurality of flight vehicles.

The condition setting unit 404 sets various conditions. The condition setting unit 404 may have a function similar to that of the condition setting unit 153. The condition setting unit 404 stores the set various conditions in the storage unit 402.

The flight vehicle control unit 406 controls the plurality of flight vehicles constituting the flight vehicle communication network. The flight vehicle control unit 406 controls, for example, the flight of the plurality of flight vehicles. The flight vehicle control unit 406 controls, for example, the communication of the plurality of flight vehicles.

For example, the flight vehicle control unit 406 controls the plurality of flight vehicles to move to respective target positions of the plurality of flight vehicles indicated by the target position information stored in the storage unit 402 and fly on the flight paths indicated by the flight path information stored in the storage unit 402. In response to the plurality of flight vehicles having moved to the respective target positions, the flight vehicle control unit 406 causes the plurality of flight vehicles to construct the flight vehicle communication network. After the construction of the flight vehicle communication network, the control device 400 controls the plurality of flight vehicles such that each of the plurality of flight vehicles forms the wireless communication area 142. The control device 400 may control the plurality of flight vehicles such that each of the plurality of flight vehicles establishes a service link with the communication device 60 in the wireless communication area 142 of each of the plurality of flight vehicles.

For each of the plurality of flight vehicles constituting the flight vehicle communication network, the weather-related information reception unit 408 receives the weather-related information of the flight vehicle. The weather-related information reception unit 408 receives the weather-related information of the flight vehicle, for example, from the weather management device 300 via the network 20.

The weather-related information reception unit 408 receives the weather-related information of the flight vehicle, for example, in response to the flight vehicle having formed the wireless communication area 142. The weather-related information reception unit 408 may periodically receive the weather-related information of the flight vehicle.

For the plurality of flight vehicles constituting the flight vehicle communication network, the weather determination unit 410 determines the weather between the flight vehicle and the gateway. For example, the weather determination unit 410 determines whether the weather between the flight vehicle and the gateway satisfies the weather condition stored in the storage unit 402, based on the weather-related information of the flight vehicle stored in the storage unit 402.

For example, for a flight vehicle for which the weather-related information reception unit 408 determines that the weather satisfies the weather condition among the plurality of flight vehicles constituting the flight vehicle communication network, the flight vehicle control unit 406 establishes a feeder link with a gateway, and controls the flight vehicle to provide a wireless communication service by using the data communication via the gateway. For a flight vehicle for which the weather-related information reception unit 408 determines that the weather does not satisfy the weather condition among the plurality of flight vehicles, the flight vehicle control unit 406 controls the flight vehicle to provide the wireless communication service by using the data communication via another flight vehicle for which the weather-related information reception unit 408 determines that the weather satisfies the weather condition, among the plurality of flight vehicles, and another gateway with which the another flight vehicle has established the feeder link. When no flight vehicle for which the weather-related information reception unit 408 determines that the weather satisfies the weather condition is present among the plurality of flight vehicles, the flight vehicle control unit 406 may control the plurality of flight vehicles such that each of the plurality of flight vehicles provides a wireless communication service by using the data communication via the communication device 60. The flight vehicle control unit 406 may store the feeder link connection information of each of the plurality of flight vehicles in the storage unit 402.

When the plurality of flight vehicles provide the wireless communication service by using the data communication via the communication device 60, the flight vehicle control unit 406 controls the plurality of flight vehicles to perform the data communication, for example, by using the network slicing technology. The flight vehicle control unit 406 may perform control to allocate a slice to the communication device 60 such that communication of the communication device 60 is prioritized over the communication of the user terminal 200 in the wireless communication area. For example, the flight vehicle control unit 406 performs control to allocate the slice corresponding to an ultra-reliable and low latency communications service to the communication device 60. For example, the flight vehicle control unit 406 performs control to allocate the slice corresponding to an enhanced mobile broadband service to the communication device 60.

For example, the flight vehicle control unit 406 selects a flight vehicle, which establishes a feeder link with a gateway, from a plurality of flight vehicles of which the weather satisfies the weather condition, such that the number of flight vehicles each establishing the feeder link with the gateway becomes a predetermined number. For example, the flight vehicle control unit 406 selects the flight vehicle, which establishes the feeder link with the gateway, from among the plurality of flight vehicles of which the weather satisfies the weather condition, such that a ratio of the number of flight vehicles each establishing the feeder link with the gateway to the number of the plurality of flight vehicles is equal to or less than a predetermined ratio. The flight vehicle control unit 406 may select the flight vehicle, which establishes the feeder link with the gateway, from the plurality of flight vehicles of which the weather satisfies the weather condition, such that a distance between the flight vehicles each establishing the gateway and the feeder link becomes longer than a predetermined distance.

For example, for one flight vehicle among the plurality of flight vehicles constituting the flight vehicle communication network, the flight vehicle control unit 406 generates the flight vehicle control information for controlling the one flight vehicle, and transmits the generated flight vehicle control information to the one flight vehicle to control the one flight vehicle. For example, when the one flight vehicle has established the feeder link with one gateway, the flight vehicle control unit 406 transmits the flight vehicle control information to the one flight vehicle via the one gateway. For example, when the one flight vehicle has not established the feeder link with the one gateway, the flight vehicle control unit 406 transmits the flight vehicle control information to the one flight vehicle via another flight vehicle among the plurality of flight vehicles and another gateway with which the another flight vehicle has established the feeder link. When the one flight vehicle has not established the feeder link with the one gateway, the flight vehicle control unit 406 may transmit the flight vehicle control information to the one flight vehicle via the communication device 60 which has established the service link with the one flight vehicle.

From one flight vehicle among the plurality of flight vehicles constituting the flight vehicle communication network, the weather-related information reception unit 408 may receive the weather-related information of the one flight vehicle. For example, when the one flight vehicle has established the feeder link with one gateway, the weather-related information reception unit 408 receives the weather-related information of the one flight vehicle via the one gateway. For example, when the one flight vehicle has not established the feeder link with the one gateway, the weather-related information reception unit 408 receives the weather-related information of the one flight vehicle via another flight vehicle among the plurality of flight vehicles and another gateway with which the another flight vehicle has established the feeder link. When the one flight vehicle has not established the feeder link with the one gateway, the weather-related information reception unit 408 may receive the weather-related information of the one flight vehicle via the communication device 60 which has established the service link with the one flight vehicle.

For each of the plurality of flight vehicles constituting the flight vehicle communication network, the flight position information reception unit 412 receives the flight position information of the flight vehicle. For example, the flight position information reception unit 412 periodically receives the flight position information of the flight vehicle. The flight position information reception unit 412 stores the received flight position information of the flight vehicle in the storage unit 402.

For example, from one flight vehicle among the plurality of flight vehicles constituting the flight vehicle communication network, the flight position information reception unit 412 receives the flight position information of the one flight vehicle. For example, when the one flight vehicle has established the feeder link with one gateway, the flight position information reception unit 412 receives the flight position information of the one flight vehicle via the one gateway. For example, when the one flight vehicle has not established the feeder link with the one gateway, the flight position information reception unit 412 receives the flight position information of the one flight vehicle via another flight vehicle among the plurality of flight vehicles and another gateway with which the another flight vehicle has established the feeder link. When the one flight vehicle has not established the feeder link with the one gateway, the flight position information reception unit 412 may receive the flight position information of the one flight vehicle via the communication device 60 which has established the service link with the one flight vehicle.

For each of the plurality of flight vehicles constituting the flight vehicle communication network, the data-communication-related information reception unit 414 receives the data-communication-related information of the flight vehicle. For example, the data-communication-related information reception unit 414 periodically receives the data-communication-related information of the flight vehicle. The data-communication-related information reception unit 414 stores the received data-communication-related information of the flight vehicle in the storage unit 402.

For example, from one flight vehicle among the plurality of flight vehicles constituting the flight vehicle communication network, the data-communication-related information reception unit 414 receives the data-communication-related information of the one flight vehicle. For example, when the one flight vehicle has established the feeder link with one gateway, the data-communication-related information reception unit 414 receives the data-communication-related information of the one flight vehicle via the one gateway. For example, when the one flight vehicle has not established the feeder link with the one gateway, the data-communication-related information reception unit 414 receives the data-communication-related information of the one flight vehicle via another flight vehicle among the plurality of flight vehicles and another gateway with which the another flight vehicle has established the feeder link. When the one flight vehicle has not established the feeder link with the one gateway, the data-communication-related information reception unit 414 may receive the data-communication-related information of the one flight vehicle via the communication device 60 which has established the service link with the one flight vehicle.

The external device communication unit 416 communicates with an external device. The external device communication unit 416 communicates with the weather management device 300 via the network 20, for example. For example, the external device communication unit 416 requests the weather management device 300 for the weather-related information of each of the plurality of flight vehicles constituting the flight vehicle communication network.

The external device communication unit 416 communicates with, for example, each of a plurality of flight vehicles constituting the flight vehicle communication network. For example, when one flight vehicle among the plurality of flight vehicles has established the feeder link with one gateway, the external device communication unit 416 communicates with the one flight vehicle via the one gateway. For example, when the one flight vehicle has not established the feeder link with the one gateway, the external device communication unit 416 communicates with the one flight vehicle via another flight vehicle among the plurality of flight vehicles and another gateway with which the another flight vehicle has established the feeder link. When the one flight vehicle has not established the feeder link with the one gateway, the external device communication unit 416 may communicate with the one flight vehicle via the communication device 60 which has established the service link with the one flight vehicle.

For example, the external device communication unit 416 requests the one flight vehicle for the weather-related information of the one flight vehicle. For example, the external device communication unit 416 requests the one flight vehicle for the flight position information of the one flight vehicle. For example, the external device communication unit 416 requests the one flight vehicle for the data-communication-related information of the one flight vehicle. When the one flight vehicle has established the feeder link with the one gateway, the external device communication unit 416 may request the one flight vehicle to determine the state of the feeder link.

For example, the external device communication unit 416 transmits, to the one flight vehicle, various types of information stored in the storage unit 402. For example, the external device communication unit 416 periodically transmits, to the one flight vehicle, various types of information stored in the storage unit 402. The external device communication unit 416 may transmit, to the one flight vehicle, various types of information stored in the storage unit 402 in response to a request from the one flight vehicle.

For example, the external device communication unit 416 transmits, to the one flight vehicle, the weather-related information of the flight vehicle constituting the flight vehicle communication network together with the one flight vehicle. The external device communication unit 416 transmits, to the one flight vehicle, the flight position information of the flight vehicle constituting the flight vehicle communication network together with the one flight vehicle. The external device communication unit 416 may transmit, to the one flight vehicle, the data-communication-related information of the flight vehicle constituting the flight vehicle communication network together with the one flight vehicle.

For each of the plurality of flight vehicles constituting the flight vehicle communication network, the weather prediction unit 418 predicts the weather between the flight vehicle and the gateway. The weather prediction unit 418 predicts the weather between the flight vehicle and the gateway, for example, based on the weather-related information of the flight vehicle received by the weather-related information reception unit 408.

The weather prediction unit 418 predicts, for example, a rainfall amount between the flight vehicle and the gateway in a predetermined period. The weather prediction unit 418 stores the predicted rainfall amount as the prediction rainfall amount in the storage unit 402. The weather prediction unit 418 may predict a snowfall amount between the flight vehicle and the gateway in a predetermined period. The weather prediction unit 418 stores the predicted snowfall amount as the prediction snowfall amount in the storage unit 402.

The feeder link determination unit 420 determines the state of the feeder link established between one flight vehicle among the plurality of flight vehicles constituting the flight vehicle communication network and one gateway, based on the feeder link connection information stored in the storage unit 402. For example, the feeder link determination unit 420 periodically determines the state of the feeder link. The feeder link determination unit 420 determines the state of the feeder link, for example, in response to the weather-related information reception unit 408 having received the weather-related information of the one flight vehicle. The feeder link determination unit 420 may determine the state of the feeder link in response to the data-communication-related information reception unit 414 having received the data-communication-related information of the one flight vehicle.

The feeder link determination unit 420 determines the state of the feeder link, for example, by determining whether the state of the feeder link satisfies the switching condition stored in the storage unit 402. The feeder link determination unit 420 determines whether the state of the feeder link satisfies the switching condition, for example, based on the weather-related information of the one flight vehicle stored in the storage unit 402. The feeder link determination unit 420 determines whether the state of the feeder link satisfies the switching condition, for example, based on the prediction result of the weather prediction unit 418 stored in the storage unit 152. The feeder link determination unit 420 may determine whether the state of the feeder link satisfies the switching condition, based on the data-communication-related information of the one flight vehicle stored in the storage unit 402.

For example, when the feeder link determination unit 420 determines that the state of the feeder link satisfies the switching condition, the flight vehicle control unit 406 selects the switching destination of the data communication of the one flight vehicle via the one gateway, from the flight vehicles for which the weather determination unit 410 determines that the weather satisfies the weather condition, among the plurality of flight vehicles constituting the flight vehicle communication network. For example, the flight vehicle control unit 406 selects, as the switching destination of the data communication of the one flight vehicle via the one gateway, the flight vehicle which has established the feeder link with the gateway. The flight vehicle control unit 406 may select, as the switching destination of the data communication of the one flight vehicle via the one gateway, the flight vehicle which has not established the feeder link with the gateway. In this case, the flight vehicle control unit 406 may control the flight vehicle selected as the switching destination to establish the feeder link with the gateway. The flight vehicle control unit 406 may control the flight vehicle 100 such that the one flight vehicle switches the data communication via the one gateway to the data communication via another flight vehicle selected as the switching destination of the data communication of the one flight vehicle via the one gateway and another gateway with which the another flight vehicle has established the feeder link.

When there is no flight vehicle for which the weather determination unit 410 determines that the weather satisfies the weather condition, the flight vehicle control unit 406 may select, as the switching destination of the data communication of the one flight vehicle via the one gateway, the communication device 60 with which the one flight vehicle has established the service link. The flight vehicle control unit 406 may control the one flight vehicle such that the one flight vehicle switches the data communication via the one gateway to the data communication via the communication device 60 selected as the switching destination of the data communication of the one flight vehicle via the one gateway.

For example, the flight vehicle control unit 406 selects the switching destination of the data communication of the one flight vehicle via the one gateway, based on the flight position of the one flight vehicle stored in the storage unit 402 and the flight position of the flight vehicle for which the weather determination unit 410 determines that the weather satisfies the weather condition. For example, the flight vehicle control unit 406 selects, as the switching destination of the data communication of the one flight vehicle via the one gateway, the flight vehicle, which has the shortest distance from the one flight vehicle, among the plurality of flight vehicles.

The flight vehicle control unit 406 may select the switching destination of the data communication of the one flight vehicle via the one gateway, based on the data-communication-related information, which is stored in the storage unit 402, of the flight vehicle for which the weather determination unit 410 determines that the weather satisfies the weather condition. For example, the flight vehicle control unit 406 selects, as the switching destination of the data communication of the one flight vehicle via the one gateway, the flight vehicle, which has the highest throughput of the data communication via the gateway, among the plurality of flight vehicles. For example, the flight vehicle control unit 406 selects, as the switching destination of the data communication of the one flight vehicle via the one gateway, the flight vehicle, which has the highest reception radio wave intensity of the radio waves received from the gateway, among the plurality of flight vehicles. The flight vehicle control unit 406 may select, as the switching destination of the data communication of the one flight vehicle via the one gateway, the flight vehicle, which has the lowest bit error rate of the signal received from the gateway, among the plurality of flight vehicles.

Figure 7:
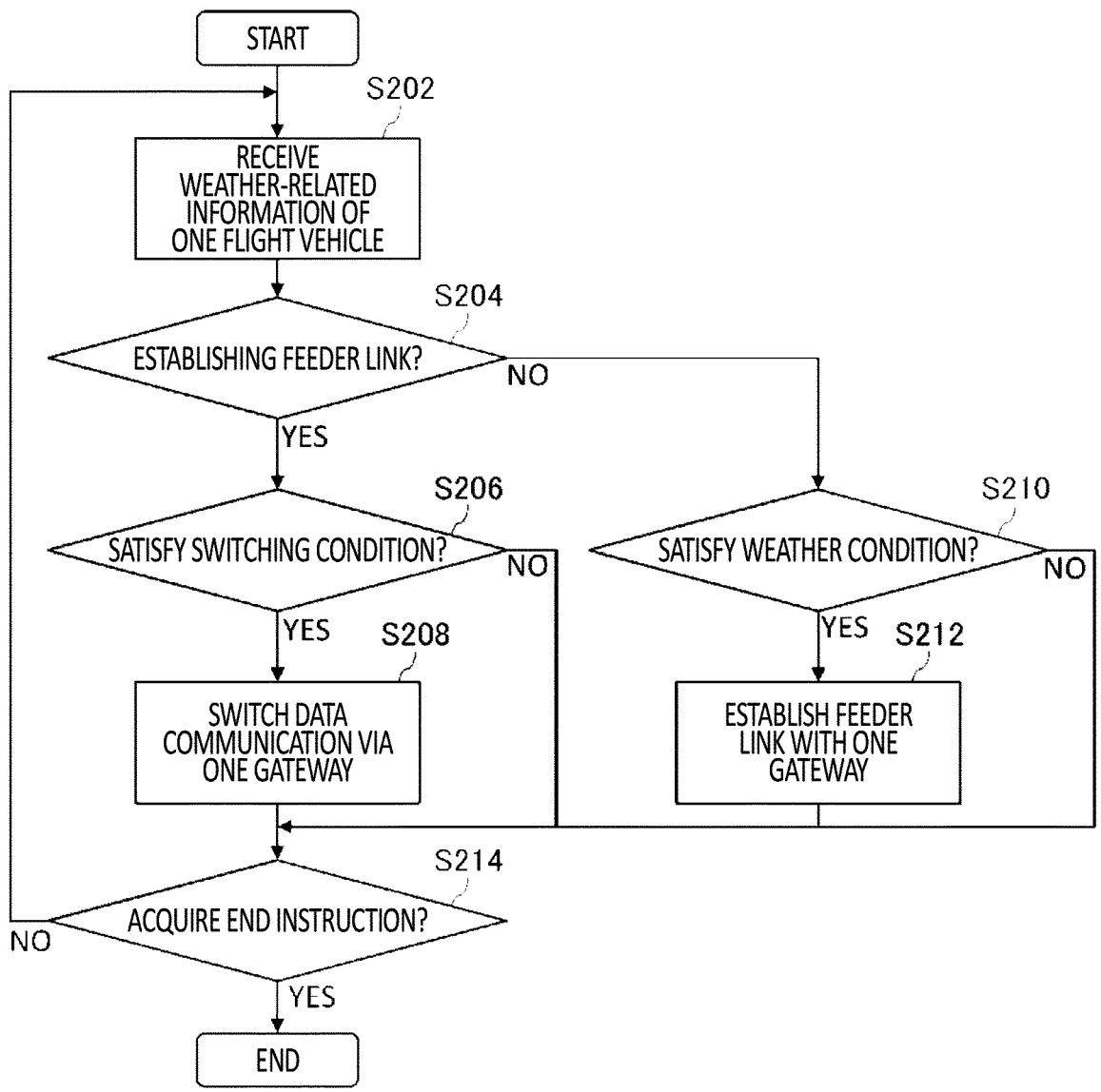
FIG. 7 is an explanatory diagram for explaining an example of a processing flow of the control device 400.

FIG. 7 is an explanatory diagram for explaining an example of a processing flow of the control device 400. In FIG. 7, a state where a plurality of flight vehicles form the flight vehicle communication network will be described as a start state.

In S202, the weather-related information reception unit 408 receives the weather-related information of one flight vehicle of the plurality of flight vehicles constituting the flight vehicle communication network. In S204, the feeder link determination unit 420 determines whether the one flight vehicle is establishing the feeder link with one gateway. The feeder link determination unit 420 determines whether the one flight vehicle is establishing the feeder link with the one gateway, for example, from the feeder link connection information of the one flight vehicle stored in the storage unit 402. If the one flight vehicle is establishing the feeder link with the one gateway, the process proceeds to S206. If the one flight vehicle has not established the feeder link with the one gateway, the process proceeds to S210.

In S206, the feeder link determination unit 420 determines whether the state of the feeder link established between the one flight vehicle and the one gateway satisfies the switching condition stored in the storage unit 402, based on the weather-related information of the one flight vehicle received in S202. If the state of the feeder link satisfies the switching condition, the process proceeds to S208. If the state of the feeder link does not satisfy the switching condition, the process proceeds to S214.

In S208, the flight vehicle control unit 406 controls the one flight vehicle to switch the data communication of the one flight vehicle via the one gateway. The flight vehicle control unit 406 controls the one flight vehicle to switch the data communication of the one flight vehicle via the one gateway, for example, to the flight vehicle for which the weather determination unit 410 determines that the weather satisfies the weather condition, among the plurality of flight vehicles. When there is no flight vehicle for which the weather determination unit 410 determines that the weather satisfies the weather condition, the flight vehicle control unit 406 may control the one flight vehicle to switch the data communication of the one flight vehicle via the one gateway to the data communication via the communication device 60 with which the one flight vehicle has established the service link. The one flight vehicle switches the data communication of the one flight vehicle via the one gateway under the control of the flight vehicle control unit 406.

In S210, the weather determination unit 410 determines whether the weather between the one flight vehicle and the one gateway satisfies the weather condition, based on the weather-related information of the one flight vehicle received in S202. If the weather between the one flight vehicle and the one gateway satisfies the weather condition, the process proceeds to S212. If the weather between the one flight vehicle and the one gateway does not satisfy the weather condition, the process proceeds to S214.

In S212, the flight vehicle control unit 406 controls the one flight vehicle to establish the feeder link with the one gateway. The one flight vehicle establishes the feeder link with the one gateway under the control of the flight vehicle control unit 406, and starts providing a wireless communication service using the data communication via the one gateway.

In S214, the control device 400 determines whether an end instruction has been acquired. The control device 400 acquires the end instruction, for example, by receiving the end instruction from the communication terminal possessed by the user of the control device 400. The user of the control device 400 is, for example, an administrator who manages the flight vehicle communication network. The control device 400 may acquire the end instruction by receiving the input of the user of the control device 400 using the input device included in the control device 400. If the control device 400 has not received the end instruction, the process returns to S202. If the control device 400 has acquired the end instruction, the processing ends.

Figure 8:
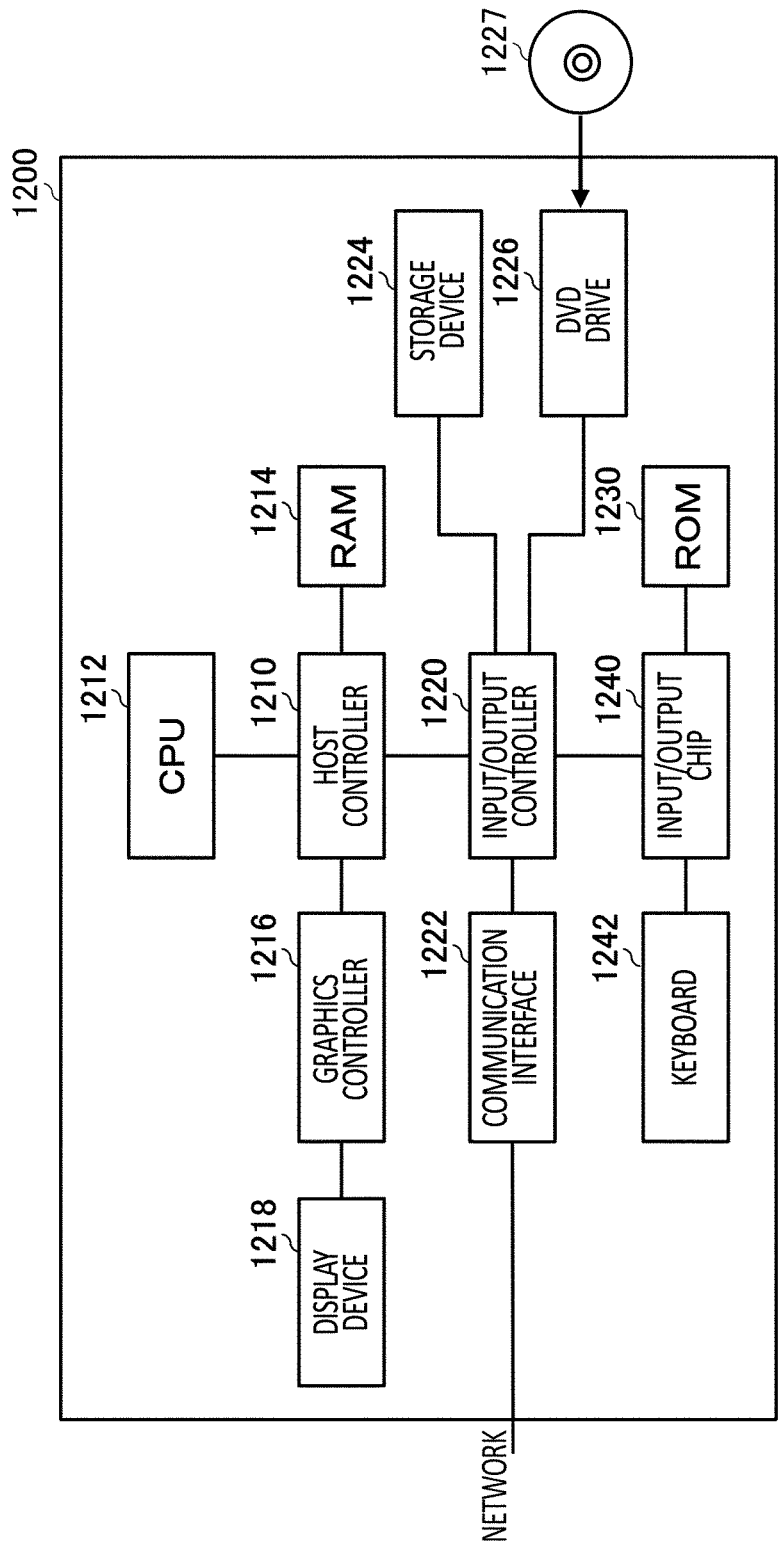
FIG. 8 schematically shows an example of a hardware configuration of a computer 1200 functioning as the control device 150 and the control device 400.

FIG. 8 schematically shows an example of a hardware configuration of a computer 1200 functioning as the control device 150 and the control device 400. Programs installed in the computer 1200 can cause the computer 1200 to function as one or more "units" of the device according to the above described embodiment or can cause the computer 1200 to execute operations associated with the devices according to the above described embodiment or the one or more "units", and/or can cause the computer 1200 to execute a process according to the above described embodiment or steps of the process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. The computer 1200 also includes a communication interface 1222, a storage device 1224, a DVD drive 1226, and an input/output unit such as an IC card drive, which are connected to the host controller 1210 via an input/output controller 1220. The DVD drive 1226 may be a DVD-ROM drive, a DVD-RAM drive, and the like. The storage device 1224 may be a hard disk drive, a solid-state drive, and the like. The computer 1200 also includes legacy input/output units such as a ROM 1230 and a keyboard 1242, which are connected to the input/output controller 1220 through an input/output chip 1240.

The CPU 1212 operates according to the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The DVD drive 1226 is configured to read the programs or the data from the DVD-ROM 1227 or the like, and to provide the storage device 1224 with the programs or the data. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer readable storage medium such as the DVD-ROM 1227 or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may be configured to cause all or a necessary portion of a file or a database, which has been stored in an external recording medium such as the storage device 1224, the DVD drive 1226 (DVD-ROM 1227), the IC card and the like, to be read into the RAM 1214, thereby executing various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby acquiring the attribute value of the second attribute associated with the first attribute satisfying a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer-readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer-readable instruction to provide means for performing operations specified by the flowchart or the block diagram. Examples of the processor include a computer processor, a processing unit, a microprocessor, a digital signal processor, a controller, a microcontroller, and the like.

While the present invention has been described by way of the embodiments, the technical scope of the present invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the present invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: network; 40: gateway; 42: gateway; 44: gateway; 46: gateway; 50: rain cloud; 52: rain cloud; 54: rain cloud; 60: communication device; 100: flight vehicle; 102: flight vehicle; 104: flight vehicle; 106: flight vehicle; 121: main wing; 122: main body; 124: propeller; 130: solar cell panel; 132: antenna; 134: antenna; 136: antenna; 138: antenna; 142: wireless communication area; 150: control device; 152: storage unit; 153: condition setting unit; 154: flight vehicle control unit; 156: weather-related information acquisition unit; 158: weather determination unit; 159:

external device communication unit; 160: flight vehicle control information reception unit; 164: flight position information acquisition unit; 166: data-communication-related information acquisition unit; 168: weather-related information reception unit; 170: data-communication-related information reception unit; 172: weather prediction unit; 174: feeder link determination unit; 200: user terminal; 300: weather management device; 400: control device; 402: storage unit; 404: condition setting unit; 406: flight vehicle control unit; 408: weather-related information reception unit; 410: weather determination unit; 412: flight position information reception unit; 414: data-communication-related information reception unit; 416: external device communication unit; 418: weather prediction unit; 420: feeder link determination unit; 1200: computer; 1210: host controller; 1212: CPU; 1214: RAM; 1216: graphics controller; 1218: display device; 1220: input/output controller; 1222: communication interface; 1224: storage device; 1226: DVD drive; 1227: DVD-ROM; 1230: ROM; 1240: input/output chip; and 1242: keyboard.

What is claimed is:

1. A control device comprising:
    a feeder link determination unit which determines a state of a feeder link established between one flight vehicle, which functions as a stratospheric platform, that forms a wireless communication area by emitting a beam, and wherein the one flight vehicle provides a wireless communication service to a user terminal in the wireless communication area and one gateway; and
    a flight vehicle control unit which controls the one flight vehicle such that, when the feeder link determination unit determines that the state of the feeder link satisfies a predetermined switching condition, the one flight vehicle switches a data communication via the one gateway to a data communication via a communication device in the wireless communication area in which the one flight vehicle has established a service link,
    wherein a beam having lower directivity in a low frequency band compared with a beam used for the feeder link is used for the service link.

2. The control device according to claim 1, wherein when the wireless communication service is provided by using the data communication via the communication device, the flight vehicle control unit controls the one flight vehicle to allocate a slice to the communication device by using a network slicing technology such that the data communication via the communication device is prioritized over a data communication via the user terminal in the wireless communication area.

3. The control device according to claim 1, further comprising
    a weather-related information acquisition unit which acquires weather-related information related to weather between the one flight vehicle and the one gateway, wherein
    the feeder link determination unit determines the state of the feeder link based on the weather-related information of the one flight vehicle.

4. The control device according to claim 3, wherein
    the weather-related information acquisition unit acquires the weather-related information of the one flight vehicle including rainfall amount information indicating a rainfall amount in a predetermined period, and
    when the feeder link determination unit determines that the feeder link is established in a state where the rainfall amount in the predetermined period is larger than a predetermined rainfall amount threshold, the flight vehicle control unit controls the one flight vehicle such that the one flight vehicle switches the data communication via the one gateway to the data communication via the communication device.

5. The control device according to claim 3, wherein
    the weather-related information acquisition unit acquires the weather-related information of the one flight vehicle including wind speed information indicating wind speed in a vicinity of the one flight vehicle, and
    when the feeder link determination unit determines that the feeder link is established in a state where the wind speed is higher than a predetermined wind speed threshold, the flight vehicle control unit controls the one flight vehicle such that the one flight vehicle switches the data communication via the one gateway to the data communication via the communication device.

6. The control device according to claim 1, further comprising
    a data-communication-related information acquisition unit which acquires data-communication-related information related to the data communication of the one flight vehicle via the one gateway, wherein
    the feeder link determination unit determines the state of the feeder link based on the data-communication-related information of the one flight vehicle.

7. The control device according to claim 6, wherein
    the data-communication-related information acquisition unit acquires the data-communication-related information of the one flight vehicle including throughput information indicating a throughput of the data communication of the one flight vehicle via the one gateway, and
    when the feeder link determination unit determines that the feeder link is established in a state where the throughput is lower than a predetermined throughput threshold, the flight vehicle control unit controls the one flight vehicle such that the one flight vehicle switches the data communication via the one gateway to the data communication via the communication device.

8. The control device according to claim 6, wherein
    the data-communication-related information acquisition unit acquires the data-communication-related information of the one flight vehicle including reception radio wave intensity information indicating reception radio wave intensity of a radio wave received from the one gateway by the one flight vehicle, and
    when the feeder link determination unit determines that the feeder link is established in a state where the reception radio wave intensity is lower than a predetermined reception radio wave intensity threshold, the flight vehicle control unit controls the one flight vehicle such that the one flight vehicle switches the data communication via the one gateway to the data communication via the communication device.

9. The control device according to claim 1, wherein when the feeder link determination unit determines that the state of the feeder link satisfies the switching condition, the flight vehicle control unit controls the one flight vehicle such that the one flight vehicle switches the data communication via the one gateway to a plurality of data communications, including the data communication, via a plurality of respective communication devices including the communication device.

10. The control device according to claim 1, further comprising:

a weather-related information reception unit which, for each of a plurality of flight vehicles constituting a flight vehicle communication network together with the one flight vehicle, receives weather-related information related to weather between at least one of the plurality of flight vehicles and at least one gateway with which the one flight vehicle has established a feeder link, wherein the at least one gateway includes the one gateway; and a weather determination unit which determines the weather for each of the plurality of flight vehicles based on the weather-related information of the plurality of flight vehicles, wherein the flight vehicle control unit controls the one flight vehicle such that the one flight vehicle switches the data communication via the one gateway to a data communication via another flight vehicle of the plurality of flight vehicles for which the weather determination unit determines that the weather satisfies a predetermined weather condition, and another gateway of the at least one gateway with which the another flight vehicle has established a feeder link.

11. The control device according to claim 10, wherein
the weather-related information reception unit receives, for each of the plurality of flight vehicles, the weather-related information including rainfall amount information indicating a rainfall amount in a predetermined period, and the flight vehicle control unit controls the one flight vehicle such that the one flight vehicle switches the data communication via the one gateway to the data communication via the another flight vehicle for which the weather determination unit determines that the rainfall amount in the predetermined period is less than a predetermined rainfall amount threshold, and the another gateway.

12. The control device according to claim 10, wherein
the weather-related information reception unit receives, for each of the plurality of flight vehicles, the weather-related information including wind speed information indicating wind speed in a vicinity of the flight vehicle, and the flight vehicle control unit controls the one flight vehicle such that the one flight vehicle switches the data communication via the one gateway to the data communication via the another flight vehicle for which the weather determination unit determines that the wind speed is lower than a predetermined wind speed threshold, and the another gateway.

13. The control device according to claim 10, further comprising
a storage unit which stores a flight position of the one flight vehicle and a flight position of each of the plurality of flight vehicles, wherein when the plurality of flight vehicles including the another flight vehicle for which the weather determination unit determines that the weather satisfies the weather condition, based on the flight position of the one flight vehicle and the flight positions of the plurality of flight vehicles including the another flight vehicle stored in the storage unit, the flight vehicle control unit controls the one flight vehicle such that the one flight vehicle switches the data communication via the one gateway to the data communication via the another flight vehicle, which has a shortest distance from the one flight vehicle, among the plurality of flight vehicles and the another gateway.

14. The control device according to claim 10, further comprising
a data-communication-related information reception unit which receives, for each of the plurality of flight vehicles, data-communication-related information related to a data communication of at least one of the plurality of flight vehicles via the gateway and including throughput information indicating a throughput of the data communication of the one flight vehicle via the at least one gateway, wherein when the plurality of flight vehicles including the another flight vehicle for which the weather determination unit determines that the weather satisfies the weather condition, the flight vehicle control unit controls the one flight vehicle such that the one flight vehicle switches the data communication via the one gateway to the data communication via the another flight vehicle, which is highest in the throughput, among the plurality of flight vehicles and the another gateway.

15. The control device according to claim 10, further comprising
a data-communication-related information reception unit which receives, for each of the plurality of flight vehicles, data-communication-related information related to a data communication of the one flight vehicle via the gateway and including reception radio wave intensity information indicating reception radio wave intensity of a radio wave received from the gateway by the one flight vehicle, wherein when the plurality of flight vehicles including the another flight vehicle for which the weather determination unit determines that the weather satisfies the weather condition, the flight vehicle control unit controls the one flight vehicle such that the one flight vehicle switches the data communication via the one gateway to the data communication via the another flight vehicle, which is highest in the reception radio wave intensity, among the plurality of flight vehicles and the another gateway.

16. The control device according to claim 10, wherein
when the another flight vehicle for which the weather determination unit determines that the weather satisfies the weather condition does not exist, the flight vehicle control unit controls the one flight vehicle such that the one flight vehicle switches the data communication via the one gateway to the data communication via the communication device.

17. A non-transitory computer-readable medium having a program recorded thereon that, when executed by a computer, causes the computer to function as:
a feeder link determination unit which determines a state of a feeder link established between one flight vehicle, which functions as a stratospheric platform, that forms a wireless communication area by emitting a beam, and wherein the one flight vehicle provides a wireless communication service to a user terminal in the wireless communication area and one gateway; and a flight vehicle control unit which controls the one flight vehicle such that, when the feeder link determination unit determines that the state of the feeder link satisfies a predetermined switching condition, the one flight vehicle switches a data communication via the one gateway to a data communication via a communication device in the wireless communication area in which the one flight vehicle has established a service link, wherein a beam having lower directivity in a low frequency band compared with a beam used for the feeder link is used for the service link.

18. A system comprising:
the control device according to claim 1; and
the one flight vehicle.

19. A control method which is executed by a computer, comprising:
determining a state of a feeder link established between one flight vehicle, which functions as a stratospheric platform, that forms a wireless communication area by emitting a beam, and wherein the one flight vehicle provides a wireless communication service to a user terminal in the wireless communication area and one gateway; and
controlling the one flight vehicle such that, when it is determined in the determining the state of the feeder link that the state of the feeder link satisfies a predetermined switching condition, the one flight vehicle switches a data communication via the one gateway to a data communication via a communication device in the wireless communication area in which the one flight vehicle has established a service link,
wherein a beam having lower directivity in a low frequency band compared with a beam used for the feeder link is used for the service link.

* * * * *